US011003509B2

(12) United States Patent
Masaki et al.

(10) Patent No.: US 11,003,509 B2
(45) Date of Patent: May 11, 2021

(54) LOCK CONTROL APPARATUS AND LOCK CONTROL METHOD

(71) Applicant: FUJITSU LIMITED, Kawasaki (JP)

(72) Inventors: Takuya Masaki, Ota (JP); Kiichi Yamada, Numazu (JP); Masahiko Nagata, Kawasaki (JP); Yoshihiro Yasuoka, Fuji (JP); Hisashi Sugawara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 16/190,884

(22) Filed: Nov. 14, 2018

(65) Prior Publication Data
US 2019/0163542 A1 May 30, 2019

(30) Foreign Application Priority Data
Nov. 29, 2017 (JP) .............................. JP2017-228577

(51) Int. Cl.
G06F 9/52 (2006.01)
G06F 16/901 (2019.01)
G06F 16/23 (2019.01)
G06F 16/22 (2019.01)

(52) U.S. Cl.
CPC ............ G06F 9/52 (2013.01); G06F 16/2336 (2019.01); G06F 16/9027 (2019.01); G06F 16/2246 (2019.01)

(58) Field of Classification Search
None
See application file for complete search history.

(56) References Cited

U.S. PATENT DOCUMENTS

| | | | | |
|---|---|---|---|---|
| 5,430,869 A | * | 7/1995 | Ishak | G06F 12/023 |
| 2005/0171960 A1 | * | 8/2005 | Lomet | G06F 16/2246 |
| 2010/0017397 A1 | | 1/2010 | Koyanagi et al. | |
| 2011/0246503 A1 | * | 10/2011 | Bender | G06F 16/258 |
| | | | | 707/769 |
| 2013/0185271 A1 | * | 7/2013 | Strain | G06F 16/2246 |
| | | | | 707/704 |

(Continued)

FOREIGN PATENT DOCUMENTS

| | | |
|---|---|---|
| JP | 9-319642 | 12/1997 |
| JP | 2010-026689 | 2/2010 |
| JP | 2011-248584 | 12/2011 |

OTHER PUBLICATIONS

Crain, Tyler et al. "A contention-friendly binary search tree." Aug. 2013. European Conference on Parallel Processing. Springer, Berlin, Heidelberg. (Year: 2013).*

Primary Examiner — Lewis A Bullock, Jr.
Assistant Examiner — Gilles R Kepnang
(74) Attorney, Agent, or Firm — Fujitsu Patent Center

(57) ABSTRACT

A lock control apparatus includes one or more memories, and one or more processors configured to perform setting of, as a target node, each of one or more child nodes other than eldest child nodes among child nodes relating to parent nodes in each of layers of data structure formed by a tree structure, when a first process for first data associated with a first node in the data structure proceeds in a direction from a parent node to a child node, perform determination of whether the first node is the target node, and perform lock of the first node when the first node is the target node.

13 Claims, 30 Drawing Sheets

(56) References Cited

U.S. PATENT DOCUMENTS

| | | | |
|---|---|---|---|
| 2014/0074841 A1* | 3/2014 | Majnemer | G06F 16/2308 707/737 |
| 2014/0108435 A1* | 4/2014 | Kolesnikov | G06F 21/6227 707/754 |
| 2014/0310317 A1* | 10/2014 | Spillane | G06F 16/9027 707/803 |
| 2015/0039575 A1* | 2/2015 | Helak | G06F 16/21 707/696 |
| 2015/0347088 A1* | 12/2015 | Bruestle | G16B 30/00 707/753 |
| 2016/0335299 A1* | 11/2016 | Vemulapati | G06F 16/2246 |
| 2017/0212680 A1* | 7/2017 | Waghulde | G06F 3/0625 |
| 2018/0046387 A1* | 2/2018 | Erdmann | G06F 3/0638 |
| 2019/0130063 A1* | 5/2019 | Parida | G16B 10/00 |

* cited by examiner

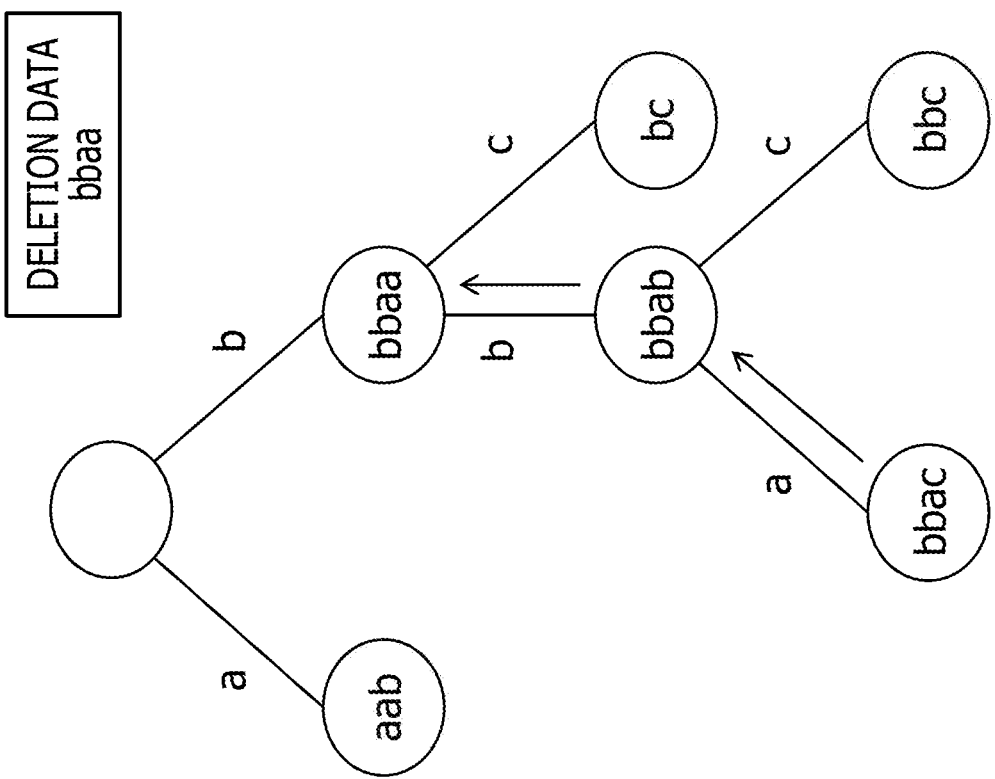
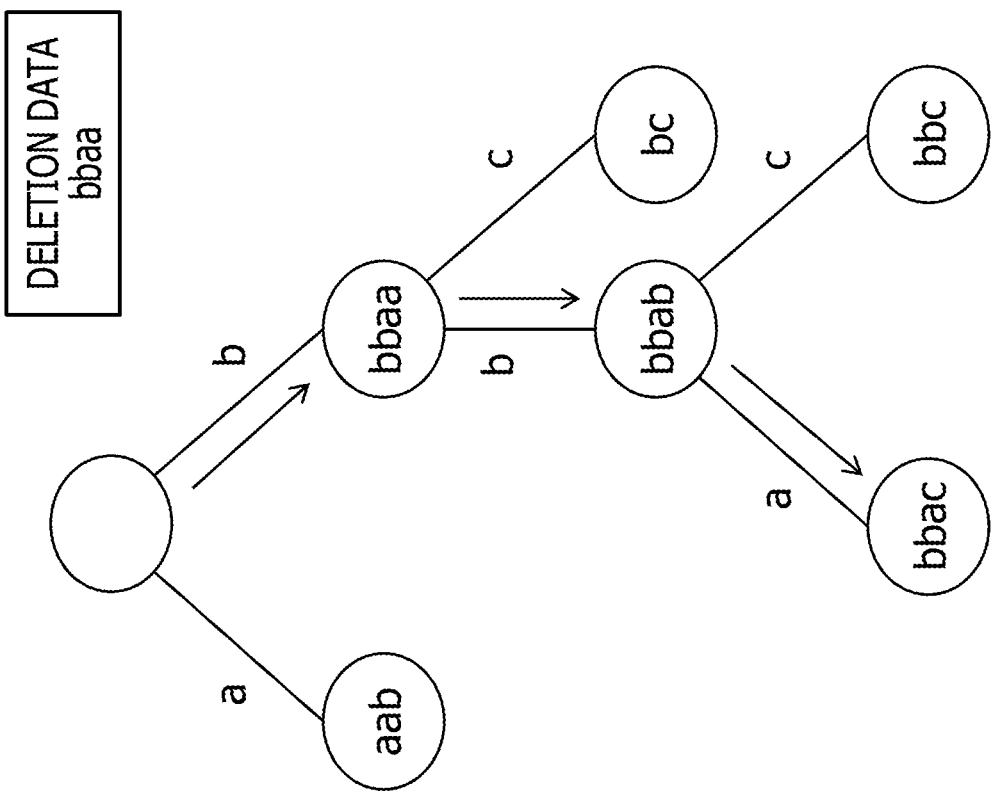

LOCK CONTROL APPARATUS AND LOCK CONTROL METHOD

CROSS-REFERENCE TO RELATED APPLICATION

This application is based upon and claims the benefit of priority of the prior Japanese Patent Application No. 2017-228577, filed on Nov. 29, 2017, the entire contents of which are incorporated herein by reference.

FIELD

The embodiment discussed herein is related to a lock control technique.

BACKGROUND

A provider that provides a service to users (hereinafter simply referred to as provider as well) constructs, for example, an information processing system using a database that stores data used for the provision of the service to the users (hereinafter referred to as search target data as well).

When search of the search target data is performed in the information processing system explained above, to efficiently perform the search of the search target data, the information processing system performs, for example, search by reference to an index including a data structure configured by a tree structure. Thereafter, the information processing system updates the data structure included in the index to a form reflecting a search result of the search target data.

Related art is disclosed in, for example, Japanese Laid-open Patent Publication Nos. 2010-026689, 9-319642, and 2011-248584.

SUMMARY

According to an aspect of the embodiments, a lock control apparatus includes one or more memories, and one or more processors configured to perform setting of, as a target node, each of one or more child nodes other than eldest child nodes among child nodes relating to parent nodes in each of layers of data structure formed by a tree structure, when a first process for first data associated with a first node in the data structure proceeds in a direction from a parent node to a child node, perform determination of whether the first node is the target node, and perform lock of the first node when the first node is the target node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are diagrams for explaining specific examples of the data structure of the index;

DESCRIPTION OF EMBODIMENTS

In a data structure included in an index, for example, lock has to be performed on an operation target node such that consistency of the data structure is secured even when a plurality of kinds of operation (for example, reference to and update of data) is performed in parallel.

However, the data structure included in the index includes, when a plurality of kinds of operation are performed in parallel, a data structure on which processing performed from a higher-level node toward a lower-level node (hereinafter referred to as first processing as well) is performed and a data structure on which processing performed from a lower-level node toward a higher-level node (hereinafter referred to as second processing as well) is performed. Therefore, in such a data structure, when the first processing and the second processing are simultaneously performed, deadlock is likely to be caused by lock involved in these kinds of processing.

Therefore, when an index including the data structures on which the first processing and the second processing are respectively performed is used, an information processing system is unable to perform a plurality of kinds of operation for the data structure in parallel because of necessity for reducing occurrence of deadlock. Therefore, the information processing system is sometimes unable to efficiently perform the kinds of operation for the data structure.

[Configuration of an Information Processing System]

Figure 1:
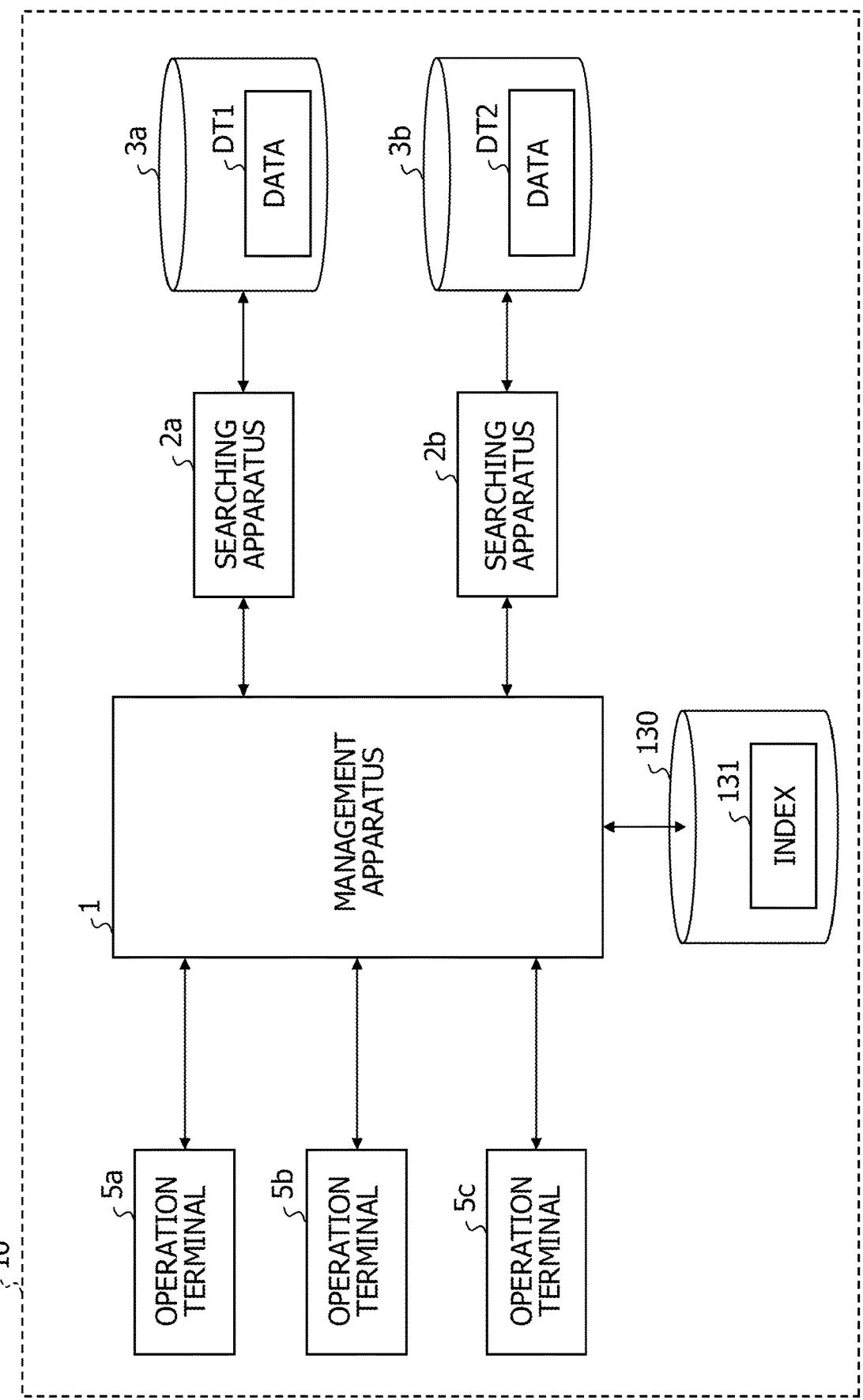
FIG. 1 is a diagram illustrating the configuration of an information processing system.

First, the configuration of an information processing system 10 is explained. FIG. 1 is a diagram illustrating the configuration of the information processing system 10.

The information processing system 10 illustrated in FIG. 1 includes, for example, a management apparatus 1, searching apparatuses 2a and 2b, databases 3a and 3b, and operation terminals 5a, 5b, and 5c. The database 3a is a database that stores data DT1 on which operation is performed by the searching apparatus 2a. The database 3b is a database that stores data DT2 (for example, data different from the data DT1) on which operation is performed by the searching apparatus 2b. In the following explanation, the searching apparatuses 2a and 2b are collectively referred to as searching apparatus 2 as well, the databases 3a and 3b are collectively referred to as database 3 as well, the operation terminals 5a, 5b, 5c are collectively referred to as operation terminal 5 as well, and the data DT1 and DT2 are collectively referred to as data DT as well.

When receiving a query to the data DT (a reference query or an update query to the data DT) from the operation terminal 5, the management apparatus 1 transmits the received query to each of the searching apparatuses 2a and 2b.

Specifically, for example, when receiving a query to the data DT from the operation terminal 5, the management apparatus 1 refers to an index 131 stored in a storing unit 130 and determines whether information corresponding to the received query is included in the index 131. When determining that the information corresponding to the received query is not included in the index 131, the management apparatus 1 directly transmits the received query to the searching apparatus 2. When determining that the information corresponding to the received query is included in the index 131, the management apparatus 1 transmits the information (for example, a physical address of search target data) included in the index 131 to the searching apparatus 2.

Consequently, the management apparatus 1 is capable of improving efficiency of execution of processing corresponding to the query and reduce a time required for the execution of the processing corresponding to the query.

The searching apparatus 2 performs, based on the query received from the management apparatus 1, operation for the data DT (reference to and update of the data DT) stored in the database 3.

Specific Example (1) of a Data Structure of the Index

A specific example of a data structure of the index 131 is explained. FIGS. 2 to 11B are diagrams for explaining specific examples of the data structure of the index 131. In the following explanation, it is assumed that the data structure of the index 131 is configured by a Full Blossom Tree, which is a type of a tree structure.

In the data structure configured by the Full Blossom Tree, nodes other than a root node and data (labels) are associated. Specifically, for example, in the data structure illustrated in FIG. 2, data including "aab" and "bbaa" are respectively associated with child nodes corresponding to the root node.

In the data structure configured by the Full Blossom Tree, branches among the nodes and the data are associated. Specifically, for example, in the data structure illustrated in FIG. 2, data including "a" is associated with a branch between the root node and a node corresponding to "aab".

In the data structure configured by the Full Blossom Tree, data associated with branches present between the root node and the nodes are included, in order from the node closest to the root node, in the heads of the data associated with the nodes. Specifically, for example, in the data structure illustrated in FIG. 2, a branch corresponding to "b", which is a first character of "bbac", a branch corresponding to "b", which is a second character of "bbac", and a branch corresponding to "a", which is a third character of "bbac" are respectively present between the root node and a node corresponding to "bbac".

Figure 2:
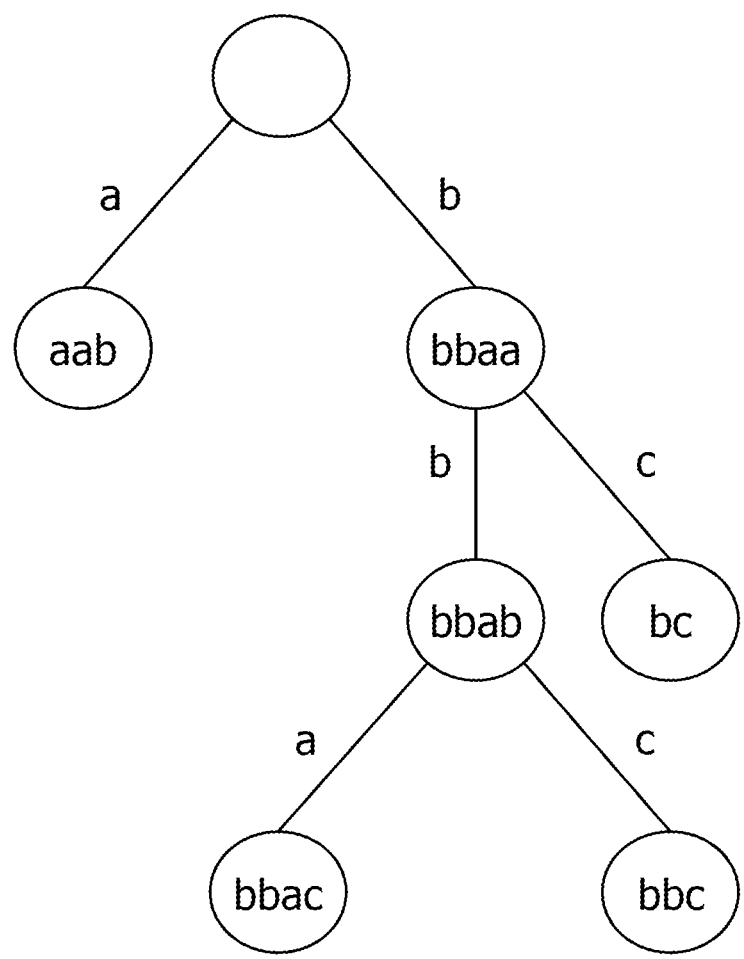
FIG. 2 is a diagram for explaining a specific example of a data structure of an index.

In the data structure configured by the Full Blossom Tree, the data are associated with the nodes to be searched in lexicographic order in depth preferential search. Explanation of the other nodes, data, and branches included in FIG. 2 is omitted.

Specific Example (1) of Processing for Performing Insertion of Data

A specific example of processing for performing insertion of data is explained. In the following explanation, data including "bba" (hereinafter referred to as insertion data as well) is inserted into the data structure explained with reference to FIG. 2.

The management apparatus 1 transitions the operation target node from the root node to any one of end nodes (nodes not having a child node) such that data obtained by coupling data associated with branches, through which the operation target node passes, in order from the data closest to the root node coincides with at least data corresponding to a head portion in the insertion data (this processing is hereinafter referred to as phase 1-1 as well).

That is, for example, all of the nodes to which the operation target node is transitioned in the phase 1-1 are nodes that may be associated with the insertion data. Therefore, the management apparatus 1 specifies the nodes to which the operation target nodes are transitioned in the phase 1-1 as nodes with which the insertion data are likely to be associated.

Figure 3A:
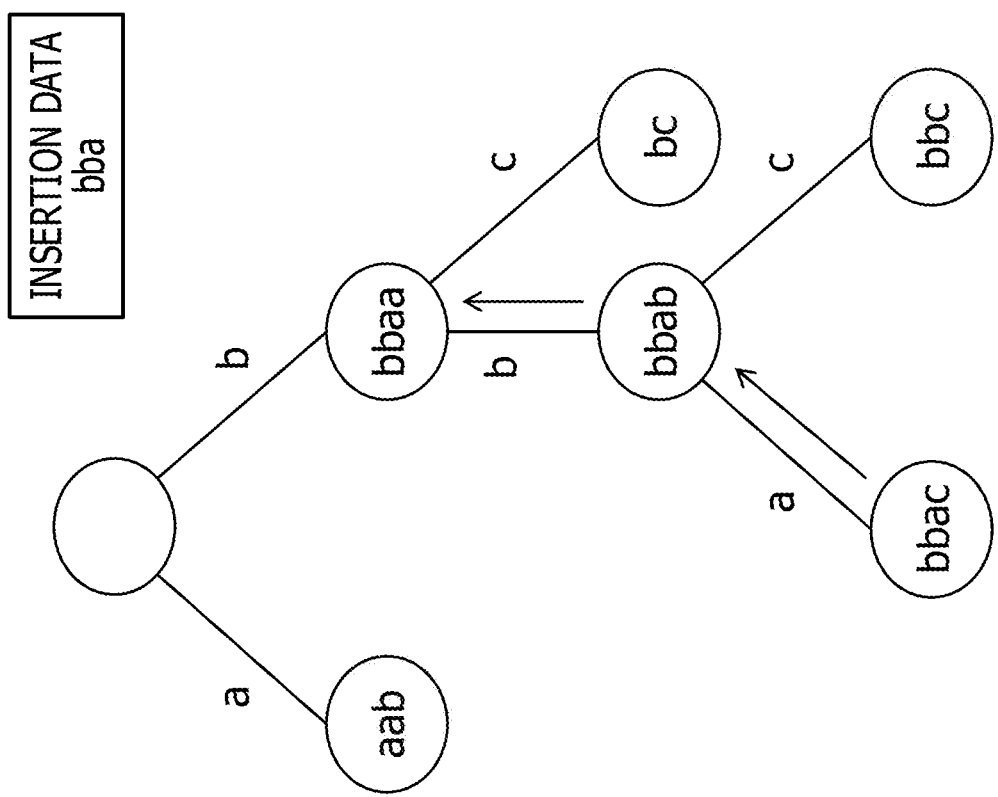
FIGS. 3A and 3B are diagrams for explaining specific examples of the data structure of the index.

Specifically, for example, in an example illustrated in FIG. 3A, a branch between the root node and a node corresponding to "bbaa", a branch between the node corresponding to "bbaa" and a node corresponding to "bbab", and a branch between the node corresponding to "bbab" and a node corresponding to "bbac" are respectively "b", "b", and "a". The node corresponding to "bbac" is an end node. Data corresponding to the head portion is "bba". Therefore, in this case, the management apparatus 1 transitions the operation target node from the root node to the node corresponding to "bbac".

Subsequently, the management apparatus 1 transitions the operation target node from the end node, to which the operation target node is transitioned in the phase 1-1, toward the root node until the operation target node reaches a node other than an eldest child node or the insertion data becomes larger than data associated with the parent node in the lexicographic order (this processing is hereinafter referred to as phase 1-2 as well).

That is, for example, among the node to which the operation target node is transitioned in the phase 1-1, nodes associated with data smaller than the insertion data are node less likely to be associated with the insertion data. As explained below, parent nodes of the nodes other than the eldest child node are nodes unlikely to be associated with the insertion data. Therefore, the management apparatus 1 specifies a node to which the operation target node is finally transitioned in the phase 1-2 as a node associated with the insertion data.

Figure 3B:
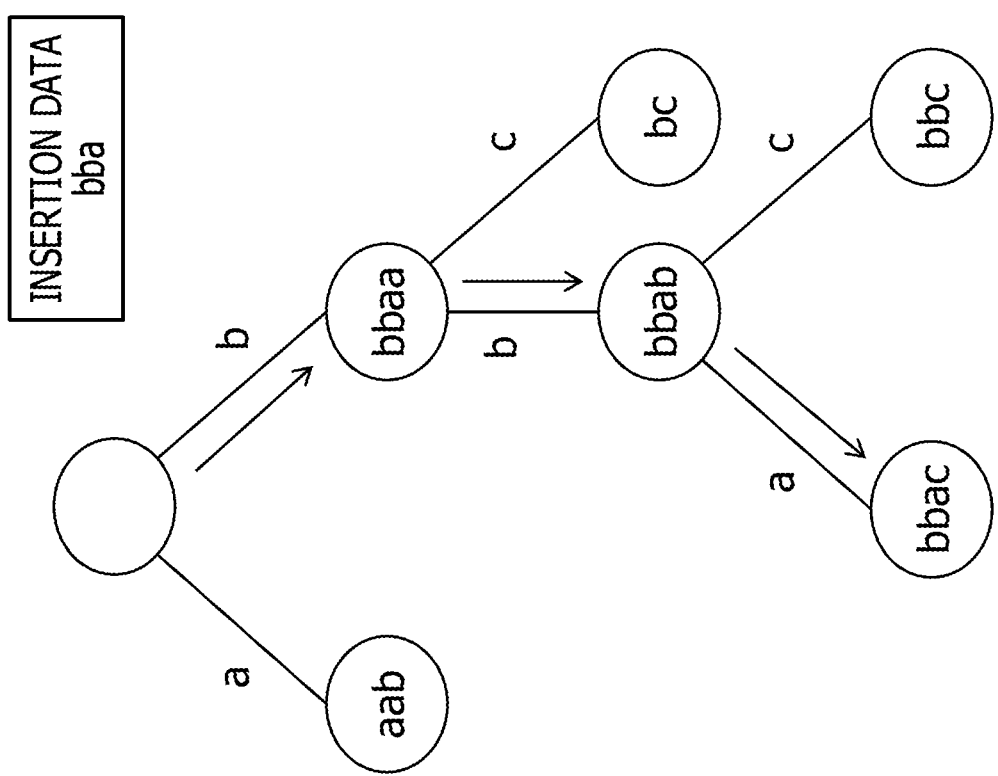

Specifically, for example, in an example illustrated in FIG. 3B, the node corresponding to "bbab" is the eldest child node of the node corresponding to "bbab" and a node corresponding to "bc". In the example illustrated in FIG. 3B, the insertion data "bba" is smaller than "bbaa" associated with a parent node of the node corresponding to "bbac". In the example illustrated in FIG. 3B, the node corresponding to "bbaa" is a node other than the eldest child node of the node corresponding to "aab" and the node corresponding to "bbaa". Therefore, in this case, the management apparatus 1 transitions the operation target node from the end node (the node corresponding to "bbac"), to which the operation target node is transitioned in the phase 1-1, toward the node corresponding to "bbaa".

Subsequently, the management apparatus 1 replaces the insertion data with data associated with the node to which the operation target node is transitioned in the phase 1-2. The management apparatus 1 performs the same processing concerning descendant nodes of the node to which the operation target node is transitioned in the phase 1-2 (this processing is hereinafter referred to as phase 1-3 as well.

Figure 4A:
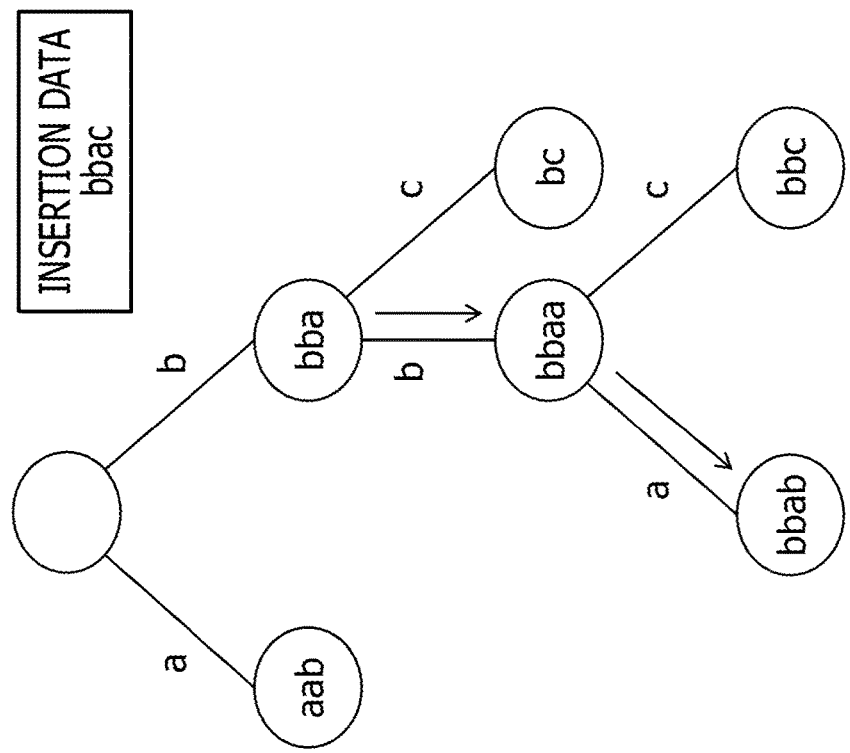
FIGS. 4A and 4B are diagrams for explaining specific examples of the data structure of the index.

Specifically, for example, as illustrated in FIG. 4A, the management apparatus 1 replaces "bba", which is the insertion data, with "bbaa", which is data associated with the node to which the operation target node is finally transitioned in the phase 1-2. The management apparatus 1 specifies "bbaa", which is the replaced data, as new insertion data.

Subsequently, as illustrated in FIG. 4A, the management apparatus 1 replaces "bbaa", which is the insertion data, with data corresponding to a child node of a node corresponding to "bba" (a node associated with the insertion data), that is, "bbab", which is the node to which the operation target node is transitioned in the phase 1-1. The management apparatus 1 specifies "bbab", which is the replaced data, as new insertion data.

As illustrated in FIG. 4A, the management apparatus 1 replaces "bbab", which is the insertion data, with data corresponding to a child node of the node corresponding to "bbaa" (a node associated with the insertion data), that is, "bbac", which is the node to which the operation target node is transitioned in the phase 1-1. The management apparatus 1 specifies "bbac", which is the replaced data, as new insertion data.

Thereafter, the management apparatus 1 generates a new node beyond the end node to which the operation target node is transitioned in the phase 1-1 and associates the insertion data with the generated new node (this processing is hereinafter referred to as phase 1-4 as well).

Figure 4B:
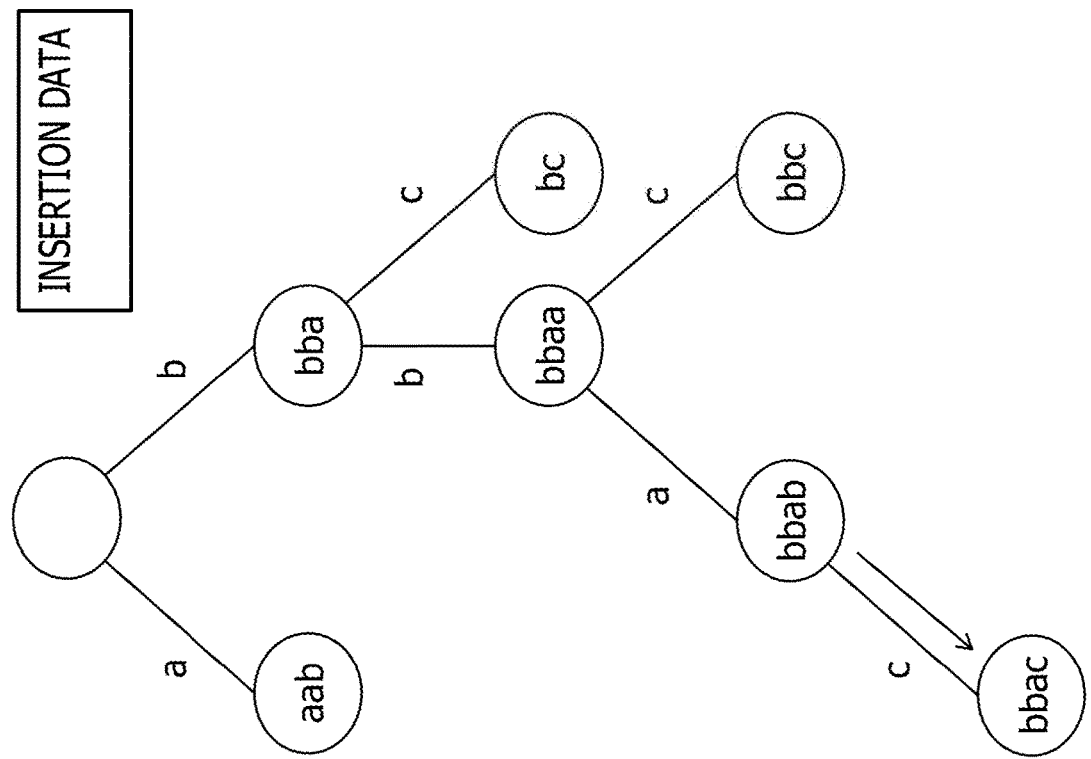

Specifically, for example, as illustrated in FIG. 4B, the management apparatus 1 generates a new node beyond the node corresponding to "bbab", which is the end node to which the operation target node is transitioned in the phase 1-1, and associates "bbac", which is the insertion data, with the new node.

When the end node is the root node in the phase 1-1 or when the insertion data is larger than the data associated with the end node to which the operation target node is transitioned in the phase 1-1, the management apparatus 1 performs the phase 1-4 without performing the phase 1-2 and the phase 1-3.

Specific Example (1) of Processing for Deleting Data

A specific example of processing for deleting data is explained. In the following explanation, data including "bbac" (hereinafter referred to as deletion data as well) among the data included in the data structure explained with reference to FIG. 2 is deleted.

The management apparatus 1 transitions the operation target node from the root node to any one of end nodes such that data obtained by coupling data associated with branches, through which the operation target node passes, in order from the data closest to the root node coincides with at least data corresponding to a head portion in the insertion data (this processing is hereinafter referred to as phase 2-1 as well).

Specifically, for example, in an example illustrated in FIG. 5A, a branch between the root node and the node corresponding to "bbac", a branch between the node corresponding to "bbac" and the node corresponding to "bbab", and a branch between the node corresponding to "bbab" and the node corresponding to "bbac" are respectively "b", "b", and "a". The node corresponding to "bbac" is an end node. Data corresponding to the head portion is "bba". Therefore, in this case, the management apparatus 1 transitions the operation target node from the root node to the node corresponding to "bbac".

Subsequently, the management apparatus 1 transitions the operation target node from the end node, to which the operation target node is transitioned in the phase 2-1, toward the root node until the operation target node reaches a node associated with the deletion node (this processing is hereinafter referred to as phase 2-2 as well).

Specifically, for example, in an example illustrated in FIG. 5B, "bbaa", which is the deletion node, coincides with data corresponding to a parent node of the node corresponding to "bbab". In the example illustrated in FIG. 5B, "bbab" is data corresponding to a parent node of the node corresponding to "bbac". Therefore, in this case, the management apparatus 1 transitions the operation target node from the end node (the node corresponding to "bbac"), to which the operation target node is transitioned in the phase 2-1, to the node corresponding to "bbaa".

When data coinciding with the deletion data is absent even if the operation target data reaches a node other than the eldest child node, the management apparatus 1 determines that the deletion data is absent.

Subsequently, the management apparatus 1 associates data associated with a child node of a node to which the operation target node is finally transitioned in the phase 2-2 with the node to which the operation target node is finally transitioned in the phase 2-2. The management apparatus 1 deletes the data associated with the child node of the node to which the operation target node is finally transitioned in the phase 2-2. The management apparatus 1 performs the same processing concerning descendant nodes of the node to which the operation target node is finally transitioned in the phase 2-2 (this processing is hereinafter referred to as phase 2-3 as well).

Figure 6A:
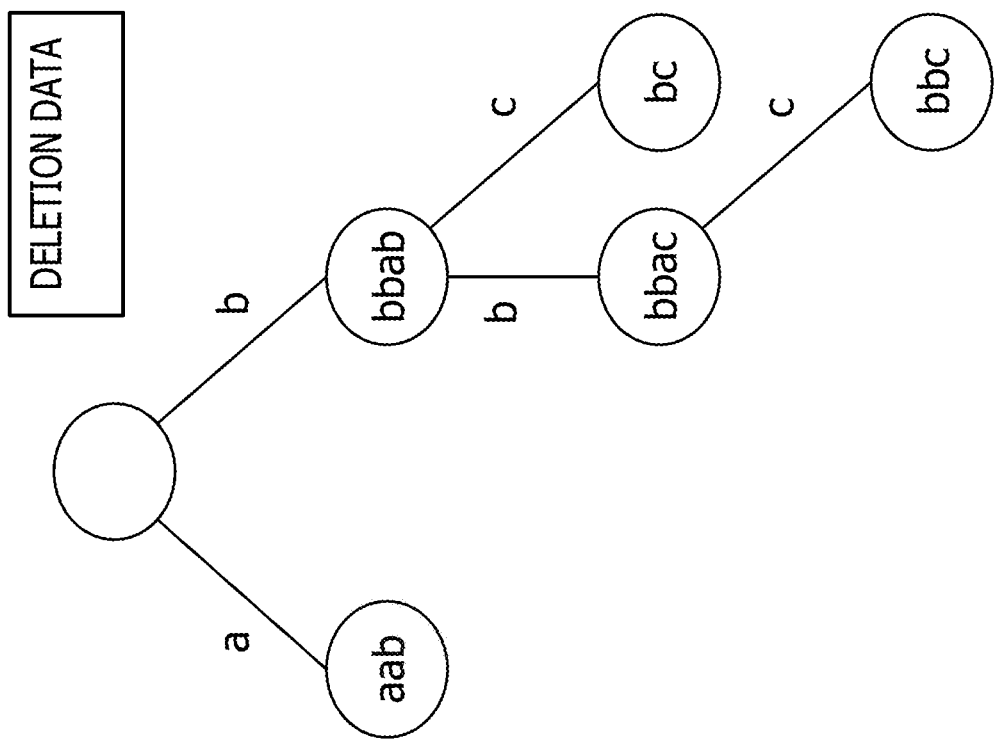
FIGS. 6A and 6B are diagrams for explaining specific examples of the data structure of the index.

Specifically, for example, as illustrated in FIG. 6A, the management apparatus 1 changes the nodes associated with "bbab" and "bbac" to the nodes associated with "bbaa" and "bbab" in the examples illustrated in FIG. 5A and the like.

Thereafter, the management apparatus 1 deletes the end node to which the operation target node is finally transitioned in the phase 2-1 (this processing is hereinafter referred to as phase 2-4 as well).

Figure 6B:
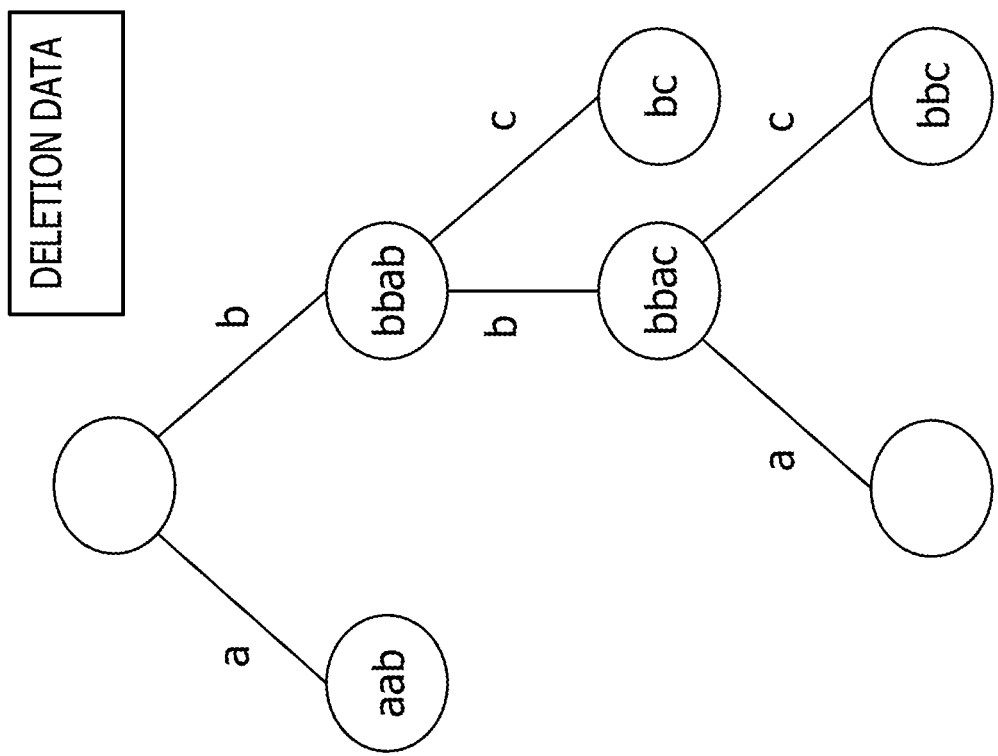

Specifically, for example, as illustrated in FIG. 6B, the management apparatus 1 deletes a node associated with "bbac" in the examples illustrated in FIG. 5A and the like.

Processing for searching data is the same as the phase 2-1 and the phase 2-2 in the processing for deleting data. Therefore, explanation of a specific example of the processing for searching data is omitted.

Specific Example (2) of the Data Structure of the Index

Another specific example of the data structure of the index 131 is explained.

In an example illustrated in FIG. 7, among the data included in the data structure explained with reference to FIG. 2, "bbac" is replaced with "bab". In the example illustrated in FIG. 7, a child node (a node corresponding to "bac") of a node corresponding to "bab" is added to the data structure explained with reference to FIG. 2.

Specific Example (2) of the Processing for Inserting Data

First, another specific example of the processing for inserting data is explained. In the following explanation, insertion data including "bba" is inserted into the data structure explained with reference to FIG. 7.

The management apparatus 1 transitions the operation target node from the root node to any one of end nodes such that data obtained by coupling data associated with branches, through which the operation target node passes, in order from the data closest to the root node coincides with at least data corresponding to a head portion in the insertion data (the phase 1-1).

Figure 8A:
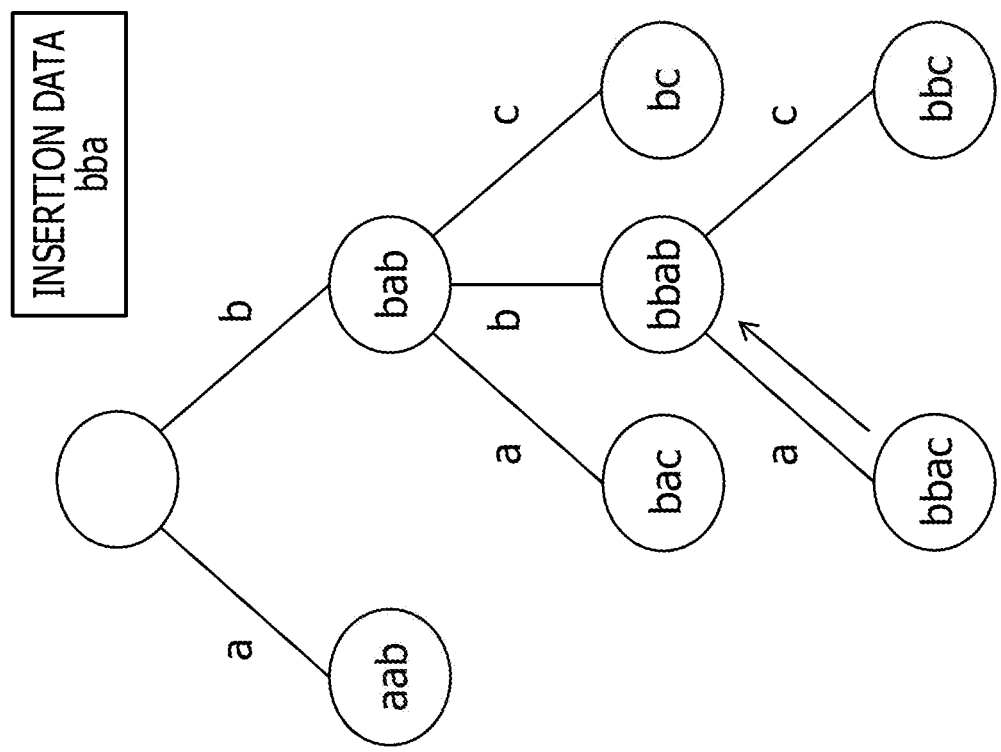
FIGS. 8A and 8B are diagrams for explaining specific examples of the data structure of the index.

Specifically, for example, in an example illustrated in FIG. 8A, a branch between the root node and the node corresponding to "bab", a branch between the node corresponding to "bab" and the node corresponding to "bbab", and a branch between the node corresponding to "bbab" and the node corresponding to "bbac" are respectively "b", "b", and "a". The node corresponding to "bbac" is an end node. Data corresponding to the head portion is "bba". Therefore, in this case, the management apparatus 1 transitions the operation target node from the root node to the node corresponding to "bbac".

Subsequently, the management apparatus 1 transitions the operation target node from the end node, to which the operation target node is transitioned in the phase 1-1, toward the root node until the insertion data becomes larger than data associated with the parent node in the lexicographic order (the phase 1-2).

Figure 8B:
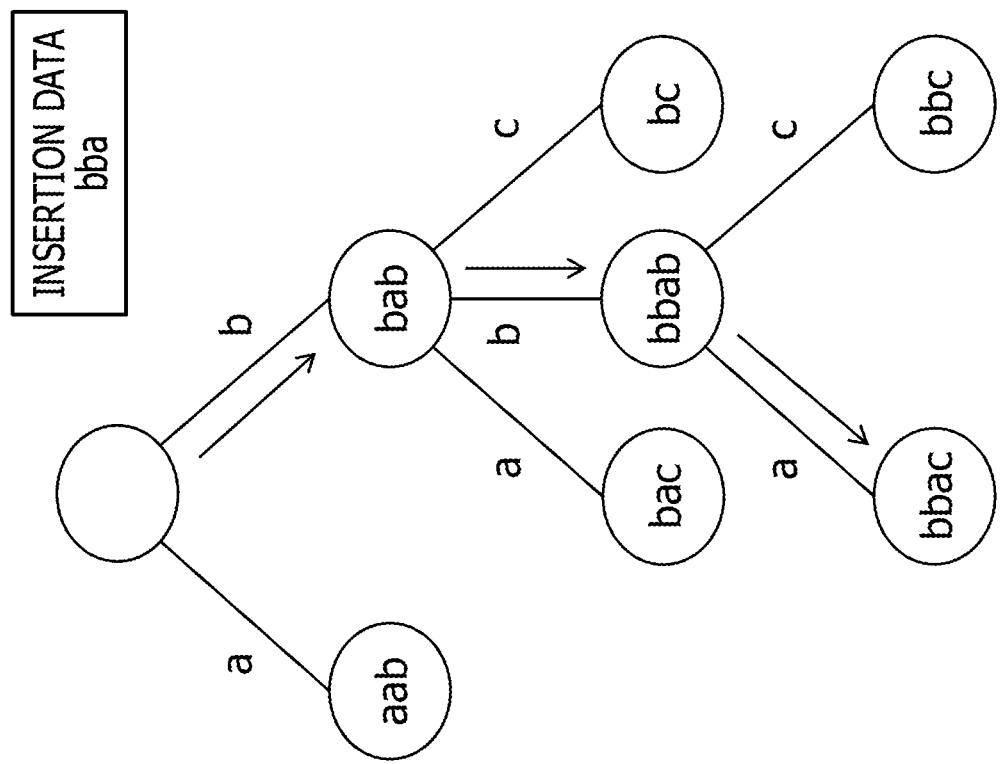

Specifically, for example, in an example illustrated in FIG. 8B, the node corresponding to "bbab" is a node other than the eldest child node among the node corresponding to "bac", the node corresponding to "bbab", and the node corresponding to "bc". Therefore, in this case, the management apparatus 1 transitions the operation target node from the end node, to which the operation target node is transitioned in the phase 1-1, (the node corresponding to "bbac") toward the node corresponding to "bbab".

That is, for example, when the node corresponding to "bbab" is a node other than the eldest child node, "b", which is data associated with a branch between the node corresponding to "bbab" and the parent node, is different from "a", which is data associated with a branch between the eldest child node (the node corresponding to "bac") and the parent node. "bab", which is data associated with a parent node of the node corresponding to "bbab", is smaller than "bac", which is data associated with the eldest child node. Therefore, in this case, "bab", which is data associate with a parent node of the node corresponding to "bbab", is usually smaller than "bba", which is the insertion data.

Therefore, in this case, the management apparatus 1 is capable of determining that the insertion data is unlikely to be associated with the data associated with the parent node of the node corresponding to "bbab". Therefore, when the operation target node reaches a node other than the eldest child node in the phase 1-2, the management apparatus 1 ends the transition of the operation target node.

Subsequently, the management apparatus 1 replaces the insertion data with data associated with a node to which the operation target node is finally transitioned in the phase 1-2. The management apparatus 1 performs the same processing concerning descendant nodes of the node to which the operation target node is finally transitioned in the phase 1-2 (the phase 1-3).

Figure 9A:
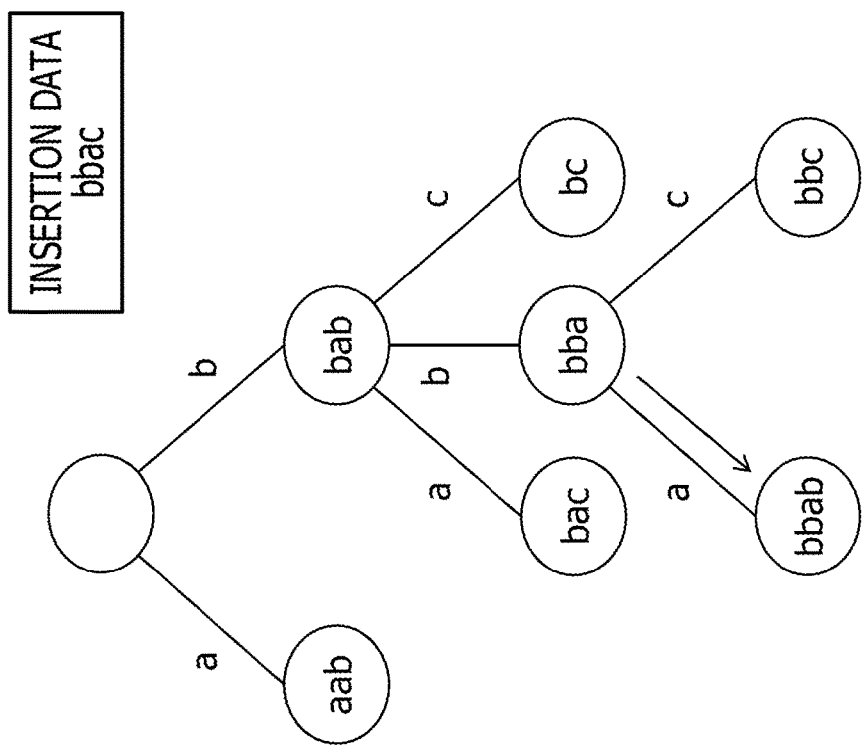
FIGS. 9A and 9B are diagrams for explaining specific examples of the data structure of the index.

Specifically, for example, as illustrated in FIG. 9A, the management apparatus 1 replaces "bba", which is the insertion data, with "bbab", which is the data associated with the node to which the operation target node is finally transitioned in the phase 1-2. The management apparatus 1 specifies "bbab", which is the replaced data, as new insertion data.

As illustrated in FIG. 9A, the management apparatus 1 replaces "bbab", which is the insertion data, with the data corresponding to "bbac", which is a child node of the node corresponding to "bba", that is, the node to which the operation target node is transitioned in the phase 1-1. The management apparatus 1 specifies "bbac", which is the replaced data, as new insertion data.

Thereafter, the management apparatus 1 generates a new node beyond the end node to which the operation target node is transitioned in the phase 1-1 and associates the insertion data with the new node (the phase 1-4).

Figure 9B:
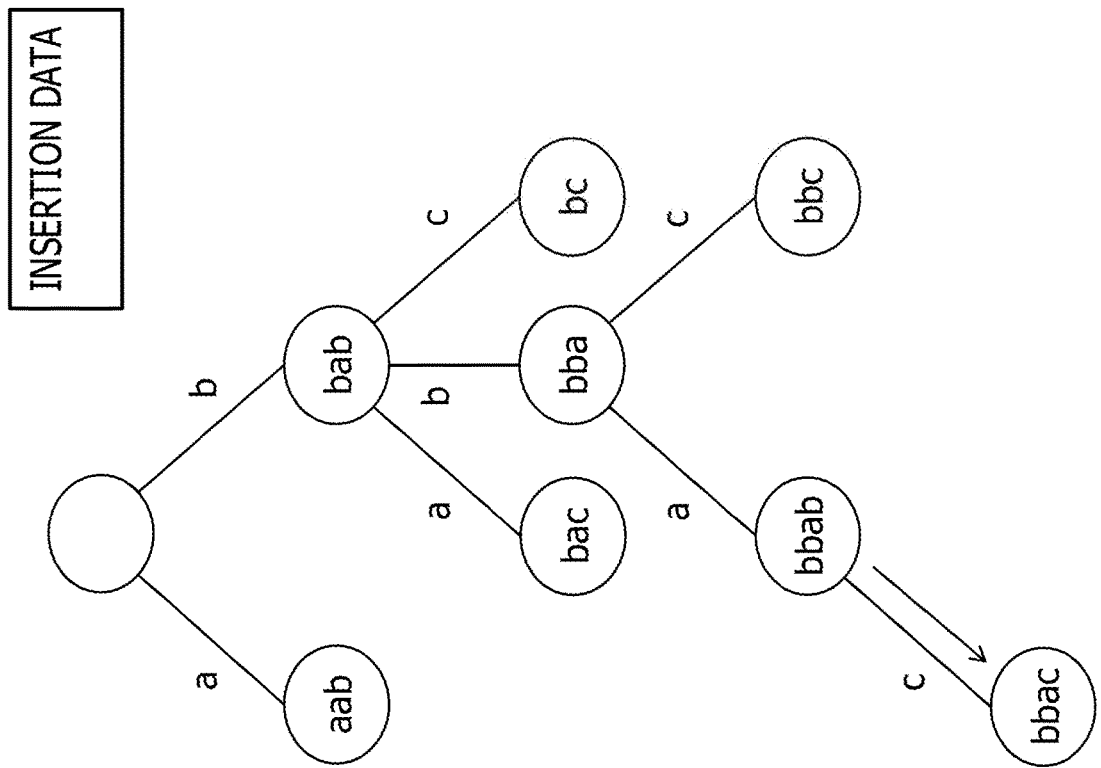

Specifically, for example, as illustrated in FIG. 9B, the management apparatus 1 generates a new node beyond the node corresponding to "bbab", which is the end node to which the operation target node is transitioned in the phase 1-1, and associates "bbac", which is the insertion data, with the new node.

Specific Example (2) of the Processing for Deleting Data

Another specific example of the processing for deleting data is explained. In the following explanation, data including "bbaa" (hereinafter referred to as deletion data as well) among the data included in the data structure explained with reference to FIG. 7 is deleted.

The management apparatus 1 transitions the operation target node from the root node to any one of end nodes such that data obtained by coupling data associated with branches, through which the operation target node passes, in order from the data closest to the root node coincides with at least data corresponding to a head portion in the insertion data (the phase 2-1).

Figure 10A:
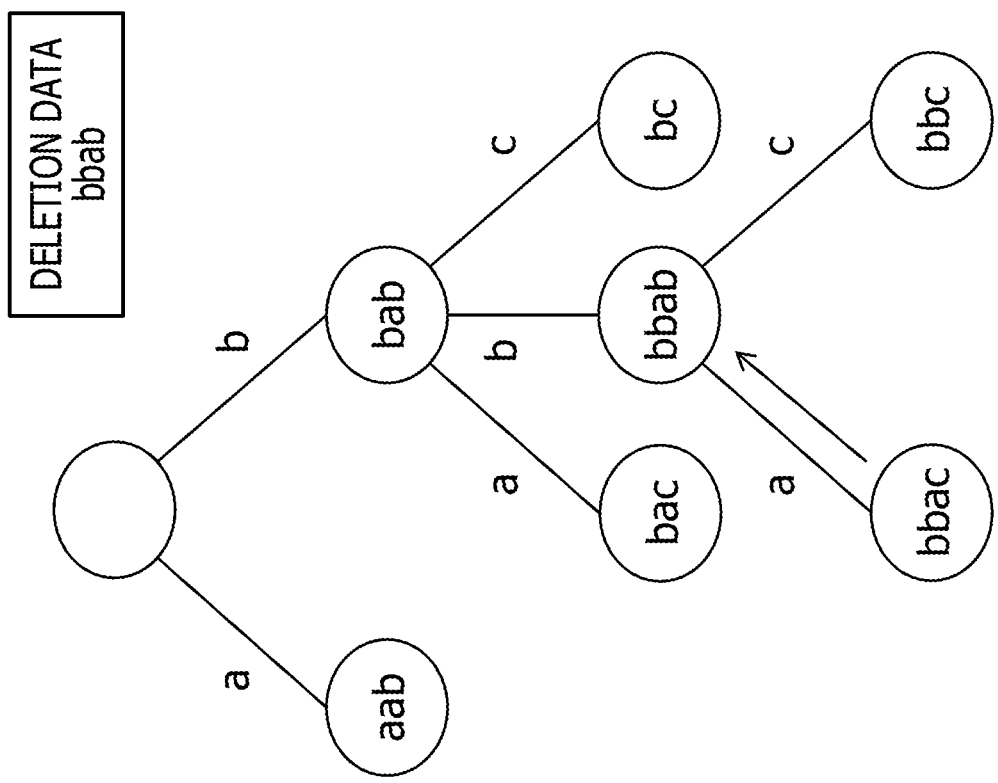
FIGS. 10A and 10B are diagrams for explaining specific examples of the data structure of the index.

Specifically, for example, in an example illustrated in FIG. 10A, a branch between the root node and the node corresponding to "bab", a branch between the node corresponding to "bab" and the node corresponding to "bbab", and a branch between the node corresponding to "bbab" and the node corresponding to "bbac" are respectively "b", "b", and "a". The node corresponding to "bbac" is an end node. Data corresponding to the head portion is "bba". Therefore, in this case, the management apparatus 1 transitions the operation target node from the root node to the node corresponding to "bbac".

Subsequently, the management apparatus 1 transitions the operation target node from the end node, to which the operation target node is transitioned in the phase 2-1, toward the root node until the operation target node reaches a node associated with the deletion node (the phase 2-2).

Figure 10B:
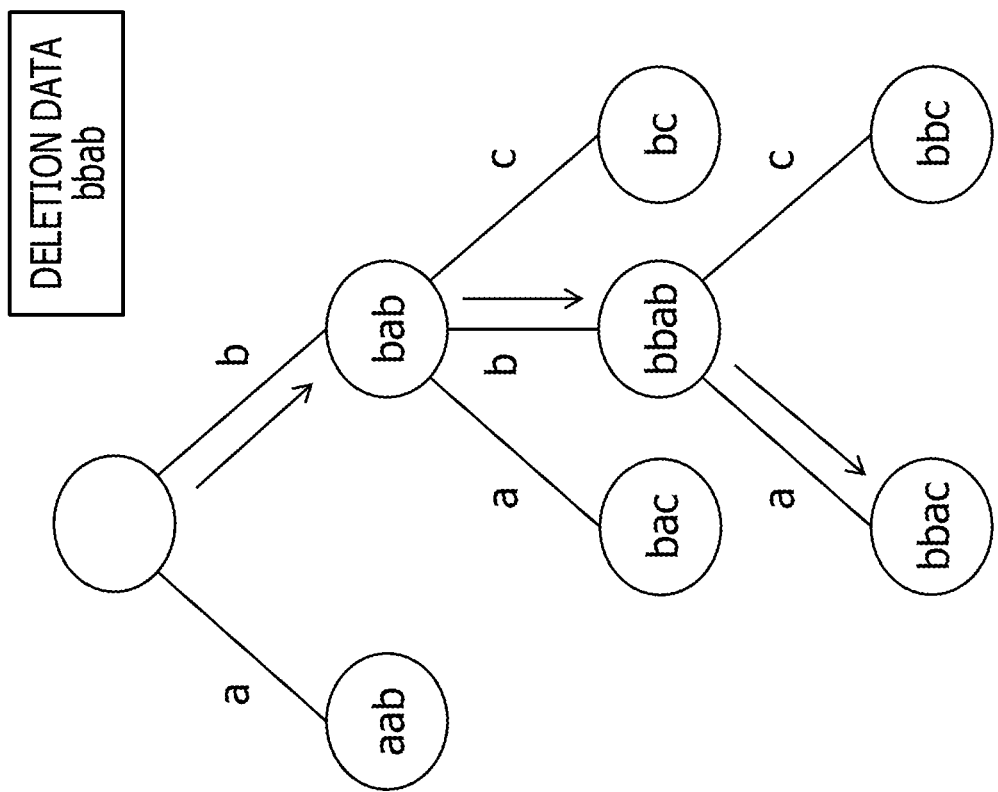

Specifically, for example, in an example illustrated in FIG. 10B, "bbab", which is the deletion node, coincides with data corresponding to a parent node of the node corresponding to "bbac". Therefore, in this case, the management apparatus 1 transitions the operation target node from the end node (the node corresponding to "bbac"), to which the operation target node is transitioned in the phase 2-1, to the node corresponding to "bbab".

Subsequently, the management apparatus 1 associates data associated with a child node of the node to which the operation target node is finally transitioned in the phase 2-2 with the node to which the operation target node is finally transitioned in the phase 2-2. The management apparatus 1 deletes the data associated with the child node of the node to which the operation target node is finally transitioned in the phase 2-2. The management apparatus 1 performs the same processing concerning descendant nodes of the node to which the operation target node is finally transitioned in the phase 2-2 (the phase 2-3).

Figure 11A:
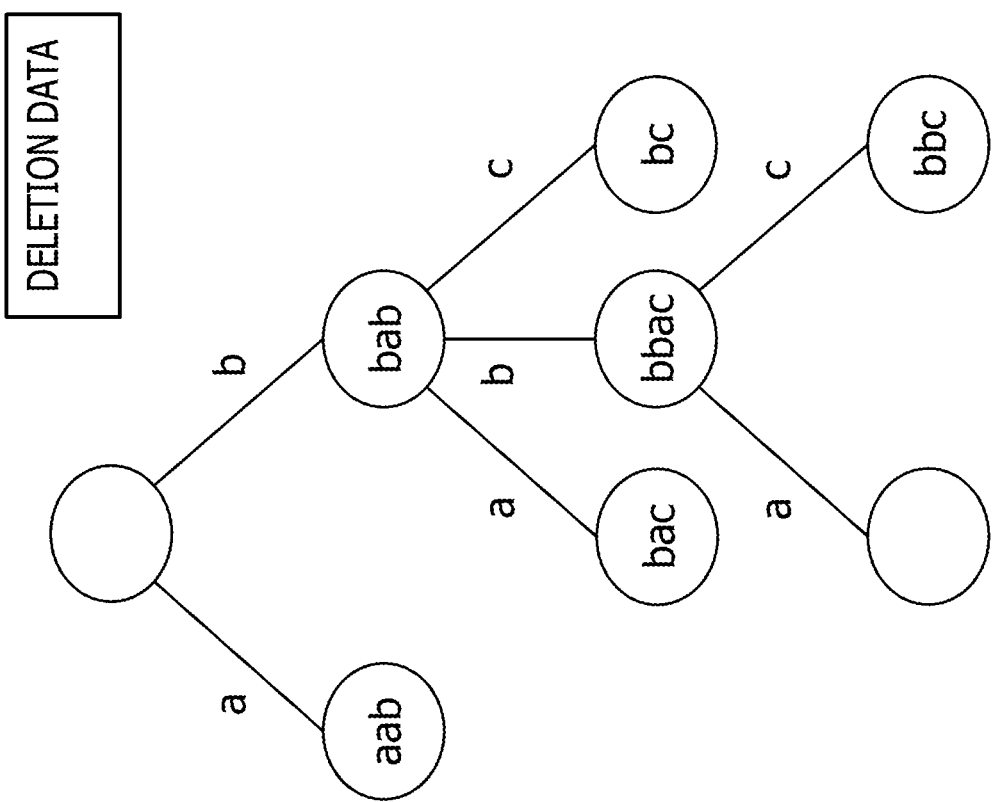
FIGS. 11A and 11B are diagrams for explaining specific examples of the data structure of the index.

Specifically, for example, as illustrated in FIG. 11A, the management apparatus 1 changes the node associated with "bbac" to a node associated with "bbab" in the examples illustrated in FIG. 10A and the like.

Thereafter, the management apparatus 1 deletes the end node to which the operation target node is finally transitioned in the phase 2-1 (the phase 2-4).

Figure 11B:
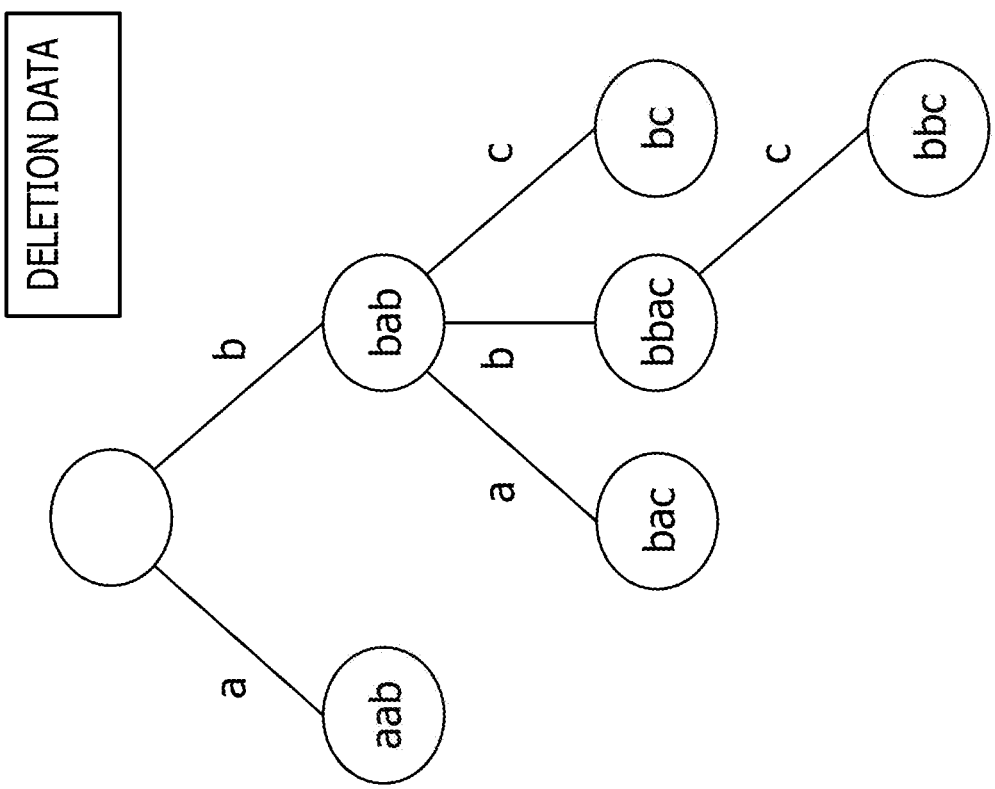

Specifically, for example, as illustrated in FIG. 11B, the management apparatus 1 deletes the node associated with "bbac" in the examples illustrated in FIG. 10A and the like.

In the index 131 explained above, when a plurality of kinds of operation are performed in parallel for the nodes included in the data structure, lock has to be performed for the nodes on which the operation is performed such that consistency of the data structure is secured.

However, the data structure explained above includes the data structure on which processing performed from a higher-level node toward a lower-level node (the first processing) is performed and the data structure on which processing performed from a lower-level node toward a higher-level node (the second processing) is performed. In such a data structure, when the first processing and the second processing are simultaneously performed, deadlock is likely to be caused by lock involved in these kinds of processing.

Therefore, when the index 131 including the data structures on which the first processing and the second processing are respectively performed is used, the information processing system 10 is unable to perform a plurality of kinds of operation for the data structure in parallel because of necessity for reducing occurrence of deadlock. Therefore, the information processing system 10 is sometimes unable to efficiently perform the kinds of operation for the data structure.

Therefore, the management apparatus 1 in this embodiment sets, as target nodes in performing lock control, child nodes other than an eldest child node among child nodes corresponding to each of parent nodes in layers of a data structure configured by a tree structure. When performing operation on data associated with the nodes in the data structure, the management apparatus 1 performs lock on the target nodes when processing for passing through the target nodes from the parent node to the child nodes is performed. The management apparatus 1 in this embodiment is an example of a lock control apparatus.

That is, for example, when the processing performed from a higher-level node toward a lower-level node (for example, the phase 1-1 explained with reference to FIGS. 3A and 3B and the like) is performed, the management apparatus 1 performs lock for nodes required during execution of the processing. In this case, the management apparatus 1 also performs lock for nodes required during execution of the processing performed from a lower-level node toward a higher-level node (for example, the phase 1-2 explained with reference to FIGS. 3A and 3B and the like). When the processing performed from a lower-level node toward a higher-level node is performed, the management apparatus 1 does not perform lock for nodes required during execution of the processing.

Consequently, the management apparatus 1 is capable of performing a plurality of kinds of operation for data in parallel while reducing occurrence of deadlock. Therefore, the management apparatus 1 is capable of efficiently performing the kinds of operation on the data.

[Hardware Configuration of the Information Processing System]

Figure 12:
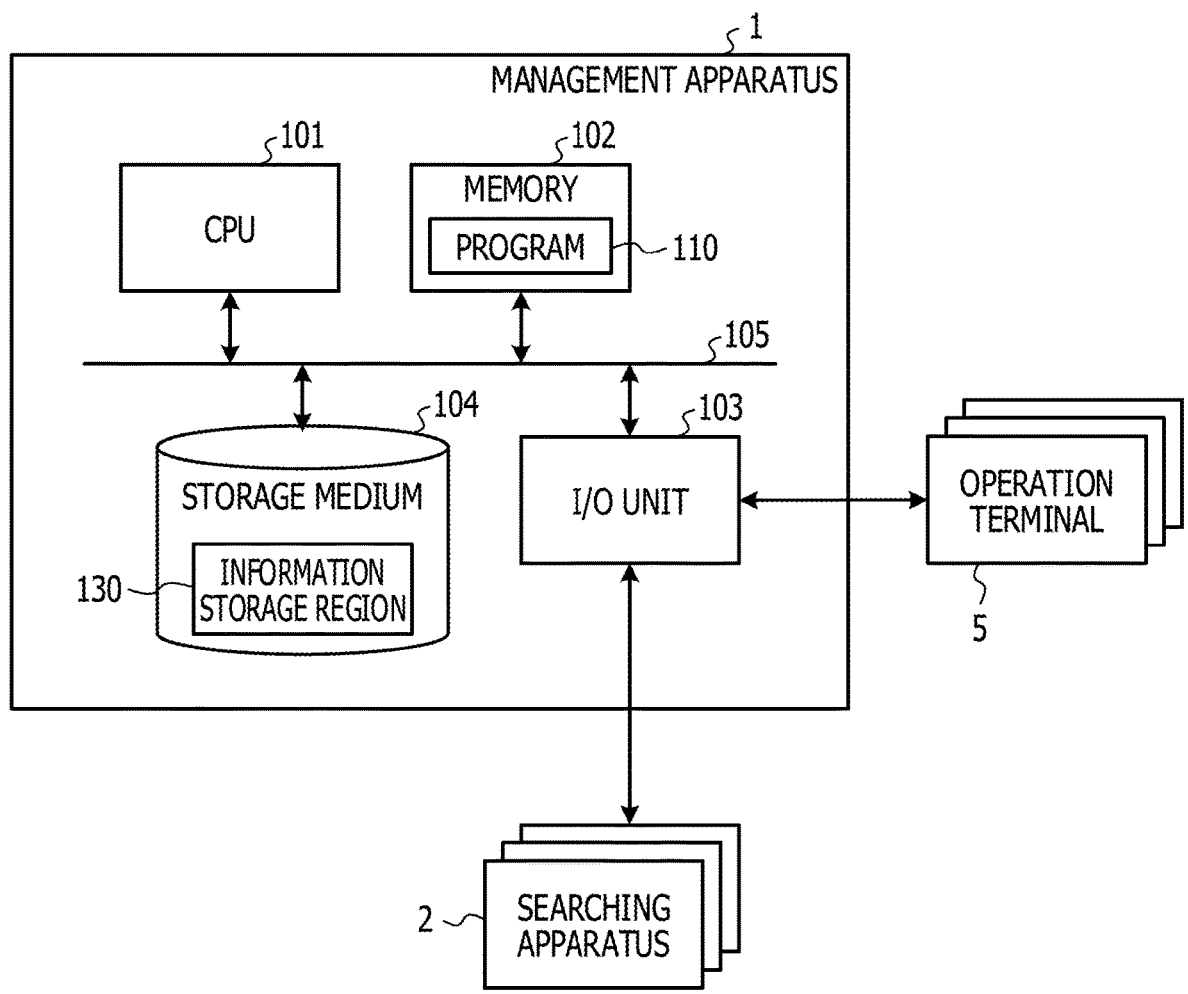
FIG. 12 is a diagram illustrating a hardware configuration of a management apparatus.

A hardware configuration of the information processing system 10 is explained. FIG. 12 is a diagram illustrating a hardware configuration of the management apparatus 1.

The management apparatus 1 includes, as illustrated in FIG. 12, a CPU 101, which is a processor, a memory 102, an external interface (an I/O unit) 103, and a storage medium 104. The units are connected to one another via a bus 105.

The storage medium 104 includes, for example, in a program storage region (not illustrated in FIG. 12) in the storage medium 104, a program 110 includes a plurality of instructions for performing processing for performing lock on nodes included in a data structure (hereinafter referred to as a lock control processing as well). The storage medium 104 includes, for example, the storing unit 130 that stores information used in performing the lock control processing (hereinafter referred to as information storage region 130 as well).

The CPU 101 performs the lock control processing in cooperation with the program 110 loaded from the storage medium 104. The external interface 103 performs communication with, for example, the searching apparatus 2 and the operation terminal 5.

[Functions of the Information Processing System]

Figure 13:
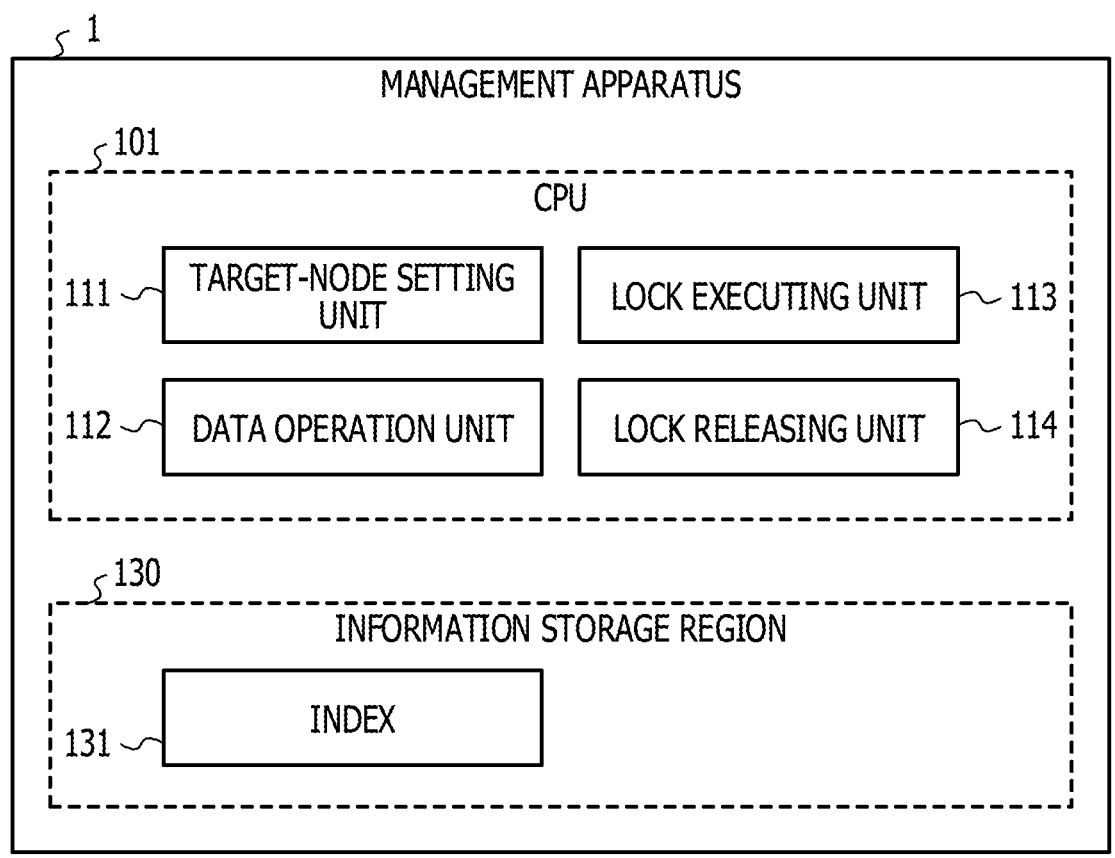
FIG. 13 is a functional block diagram of the management apparatus.

Functions of the information processing system 10 are explained. FIG. 13 is a functional block diagram of the management apparatus 1.

As illustrated in FIG. 13, the CPU 101 of the management apparatus 1 cooperates with the program 110 to thereby operate as, for example, a target-node setting unit 111, a data operation unit 112, a lock executing unit 113, and a lock releasing unit 114. For example, the index 131 (the data structure of the index 131) is stored in the information storage region 130.

The target-node setting unit 111 sets, as target nodes in performing lock control, child nodes other than an eldest child node among child nodes corresponding to each of parent nodes in layers of the data structure of the index 131.

The data operation unit 112 performs operation on the nodes (data associated with the nodes) included in the data structure of the index 131 according to reception of a query from the operation terminal 5. Specifically, for example, the data operation unit 112 performs, for example, insertion, deletion, or search of data included in the data structure of the index 131.

When the data operation unit 112 performs operation on the data included in the data structure of the index 131, the lock executing unit 113 performs lock on the target nodes set by the target-node setting unit 111 when processing for passing through the target nodes from the parent node to the child nodes is performed.

When lock is performed on the target node set by the target-node setting unit 111 (hereinafter referred to as first target node as well), the lock releasing unit 114 releases the lock of the first target node when processing for passing through a second target node, which is a descendant node of the first target node, from the parent node to the child nodes is performed.

Overview of the First Embodiment

Figure 14:
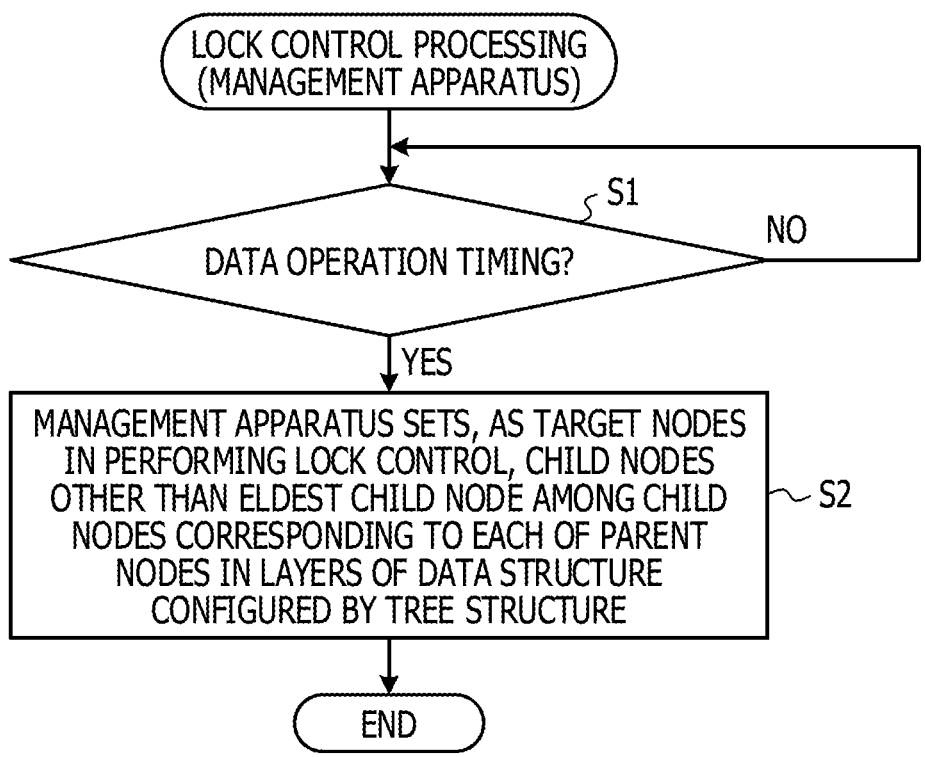
FIG. 14 is a flowchart for explaining an overview of lock control processing in a first embodiment.
Figure 15:
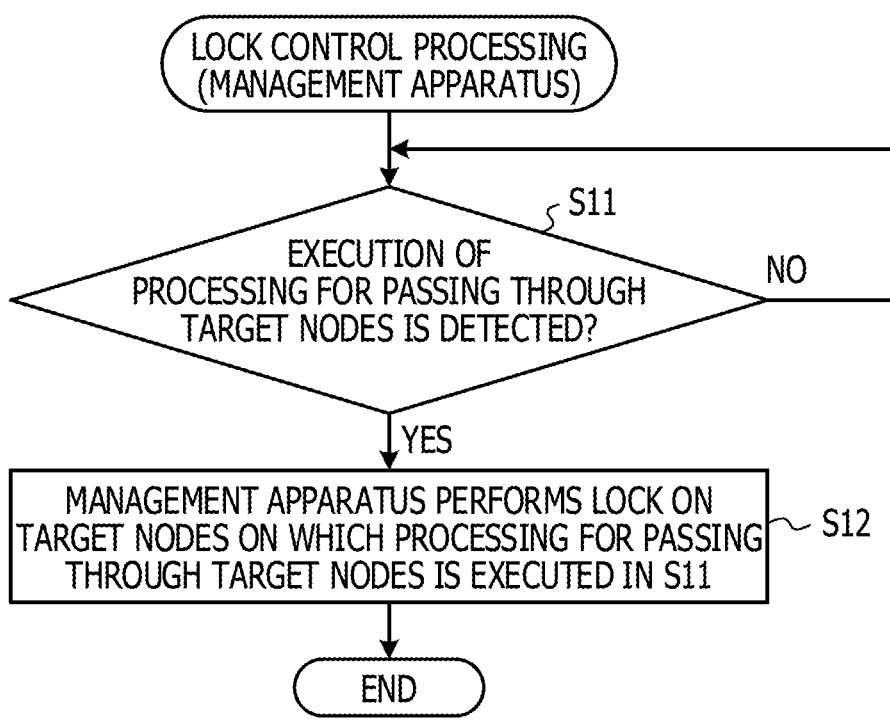
FIG. 15 is a flowchart for explaining an overview of the lock control processing in the first embodiment.

An overview of the first embodiment is explained. FIGS. 14 and 15 are flowcharts for explaining an overview of lock control processing in the first embodiment.

As illustrated in FIG. 14, the management apparatus 1 stays on standby until data operation timing (NO in S1). The data operation timing is, for example, timing when operation on the data included in the data structure of the index 131 is performed according to reception of a query from the operation terminal 5.

When the data operation timing comes (YES in S1), the management apparatus 1 sets, as target nodes in performing lock control, child nodes other than an eldest child node among child nodes corresponding to each of parent nodes in layers of a data structure configured by a tree structure (S2).

Thereafter, as illustrated in FIG. 15, the management apparatus 1 stays on standby until execution of processing for passing through the target nodes set in the processing in S2 from the parent node to the child nodes is detected (NO in S11).

When the execution of the processing for passing through the target nodes set in the processing in S2 is detected (YES in S11), the management apparatus 1 performs lock on the target nodes on which the processing for passing through the target nodes is executed in the processing in S11 (S12).

That is, for example, when processing performed from a higher-level node to a lower-level node is performed, the management apparatus 1 performs lock for nodes required during execution of the processing. In this case, the management apparatus 1 also performs lock for nodes required during execution of processing performed from a lower-level node toward a higher-level node. When the processing performed from a lower-level node toward a higher-level node is performed, the management apparatus 1 does not perform lock for nodes required during execution of the processing.

Consequently, the management apparatus 1 is capable of performing a plurality of kinds of operation for data in parallel while reducing occurrence of deadlock. Therefore, the management apparatus 1 is capable of efficiently performing the kinds of operation for the data.

Details of the First Embodiment

Figure 16:
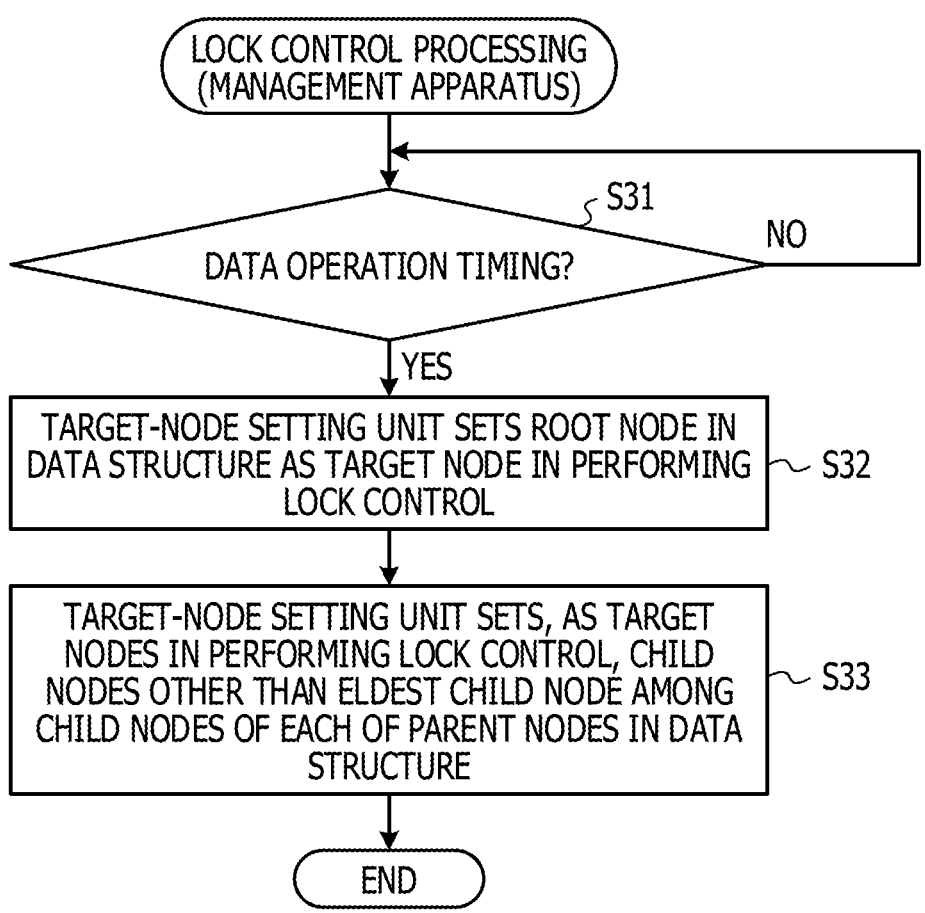
FIG. 16 is a flowchart for explaining details of the lock control processing in the first embodiment.
Figure 17:
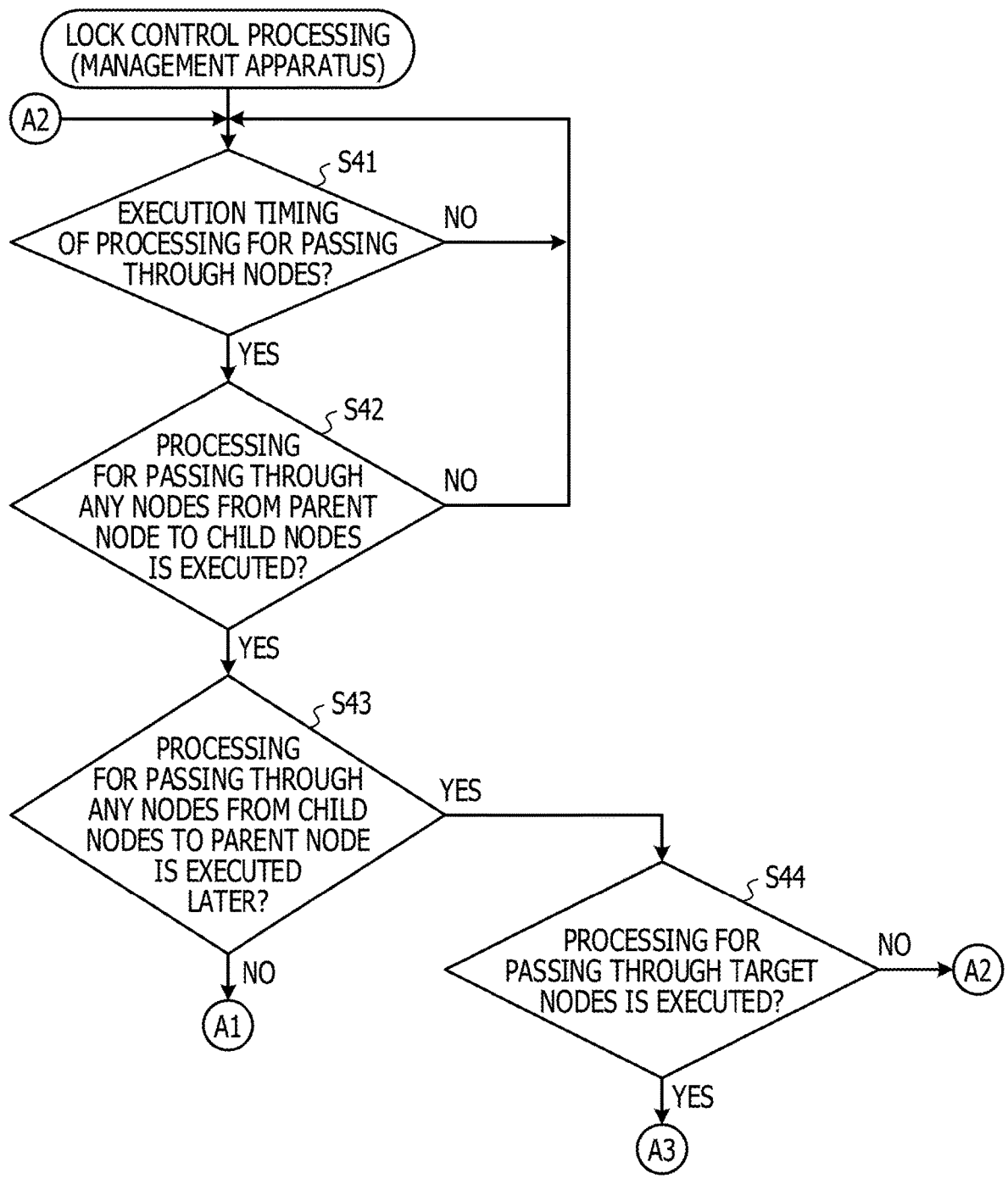
FIG. 17 is a flowchart for explaining details of the lock control processing in the first embodiment.
Figure 18:
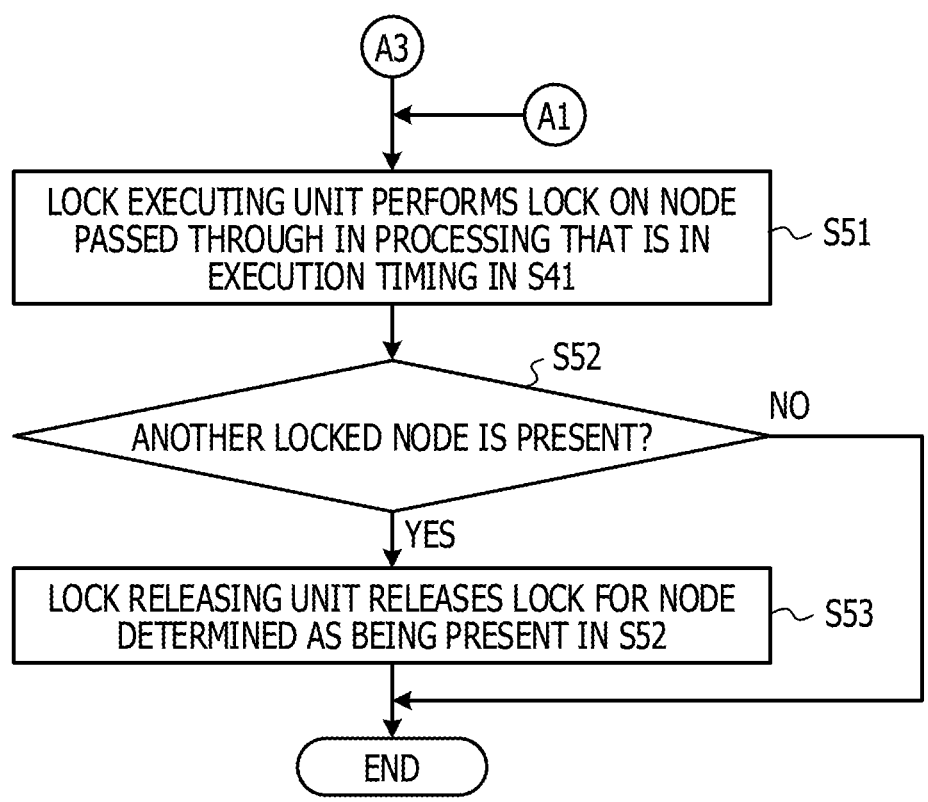
FIG. 18 is a flowchart for explaining details of the lock control processing in the first embodiment.

Details of the first embodiment are explained. FIGS. 16 to 18 are flowcharts for explaining details of the lock control processing in the first embodiment. FIGS. 19 to 30B are diagrams for explaining the details of the lock control processing in the first embodiment. The details of the lock control processing illustrated in FIGS. 16 to 18 are explained with reference to FIGS. 19 to 30B.

As illustrated in FIG. 16, the target-node setting unit 111 of the management apparatus 1 stays on standby until the data operation timing (NO in S31).

When the data operation timing comes (YES in S31), the target-node setting unit 111 sets, as a target node in performing lock control, the root node in the data structure of the index 131 (S32).

Subsequently, the target-node setting unit 111 sets, as target nodes in performing the lock control, child nodes other than an eldest child node among child nodes of each of parent nodes in the data structure of the index 131 (S33).

Thereafter, as illustrated in FIG. 17, the data operation unit 112 of the management apparatus 1 stays on standby until timing for executing processing for passing through any nodes included in the data structure of the index 131 (hereinafter referred to as specific processing as well) comes (NO in S41). That is, for example, the data operation unit 112 stays on standby until operation for data included in the data structure of the index 131 is performed according to, for example, reception of a query from the operation terminal 5.

When the timing for executing the processing for passing through any nodes included in the data structure of the index 131 comes (YES in S41), the data operation unit 112 determines whether the specific processing is processing for passing through any nodes from the parent node to the child node (S42).

Specifically, for example, the data operation unit 112 determines whether the specific processing is the phase 1-1 or the phase 1-3.

As a result, when determining that the specific processing is not the processing for passing through any nodes from the parent node to the child nodes (NO in S42), the data operation unit 112 performs the processing in S41 and subsequent steps again.

That is, for example, when the specific processing is the phase 1-2, the data operation unit 112 determines that the specific processing is processing in which it is not requested to perform lock during execution.

When determining that the specific processing is the processing for passing through any nodes from the parent node toward the child nodes (YES in S42), the data operation unit 112 determines whether the processing for passing through any nodes from the parent node to the child nodes is executed after the specific processing (S43).

Specifically, for example, the data operation unit 112 determines whether the specific processing is processing for executing the phase 1-2 later.

As a result, when determining that the processing for passing through any nodes from the parent node to the child nodes is executed after the specific processing (YES in S43), the data operation unit 112 determines whether the nodes passed through in the specific processing are the target nodes set in the processing in S32 or S33 (S44).

When determining that the nodes passed through in the specific processing are not the target nodes set in the processing in S32 or S33 (NO in S44), the data operation unit 112 performs the processing in S41 and subsequent steps again.

That is, for example, when the specific processing is the phase 1-1 and the nodes passed through in the specific processing are not the target nodes, the data operation unit 112 determines that the specific processing is processing in which lock does not have to be performed during execution.

When the data operation unit 112 determines that the nodes passed through in the specific processing are the target nodes set in the processing in S32 or S33 (YES in S44), as illustrated in FIG. 18, the lock executing unit 113 of the management apparatus 1 performs lock on the nodes passed through in the specific processing (S51).

The lock executing unit 113 performs the processing in S51 in the same manner when the data operation unit 112 determines in the processing in S43 that the processing for passing through any nodes from the parent node to the child nodes is not executed after the specific processing (NO in S43).

That is, for example, when the specific processing is the phase 1-1 (YES in S43), only when the nodes passed through in the specific processing are the target nodes (YES in S44), the lock executing unit 113 performs lock on the node in the specific processing. For example, when the specific processing is the phase 1-3 (NO in S43), irrespective of whether the nodes passed through in the specific processing are the target nodes, the lock executing unit 113 performs lock on the nodes in the specific processing.

Thereafter, the lock releasing unit 114 of the management apparatus 1 determines whether another locked node is present among the nodes included in the data structure of the index 131 (S52).

As a result, when determining that another locked node is present (YES in S52), the lock releasing unit 114 releases the lock for the node determined as being present in the processing in S52 (S53). When determining that another locked node is absent (NO in S52), the lock releasing unit 114 does not perform the processing in S53.

The management apparatus 1 ends the lock control processing. A specific example of the lock control processing in the first embodiment is explained below.

Specific Examples of the Lock Control Processing in the First Embodiment

FIGS. 19 to 30B are diagrams for explaining specific examples of the lock control processing in the first embodiment. Specifically, for example, the examples illustrated in FIGS. 19 to 30B are examples in which the lock control processing is executed on the data structures explained with reference to FIGS. 2 to 11B. In the following explanation, it is assumed that lock performed by the lock executing unit 113 is update lock.

Specific Example (1) of the Target Nodes

First, a specific example of the target nodes is explained.

Figure 19:
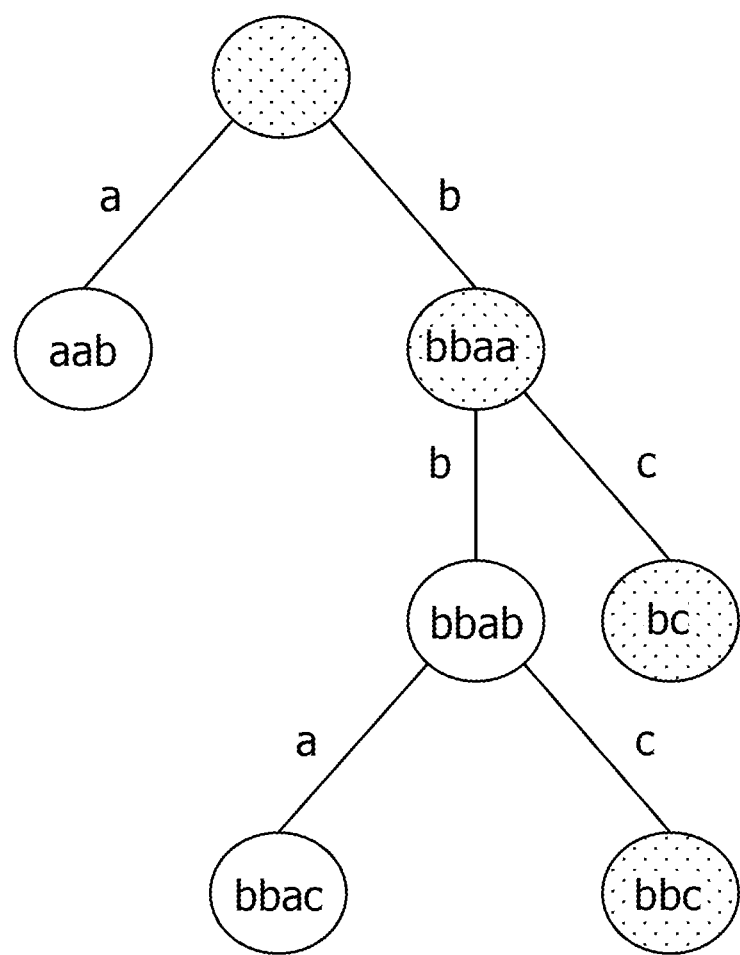
FIG. 19 is a specific example for explaining setting of target nodes for the data structure explained with reference to FIG. 2.

FIG. 19 is a specific example for explaining setting of target nodes for the data structure explained with reference to FIG. 2. In the following explanation, it is assumed that hatched nodes are the target nodes.

As illustrated in FIG. 19, the target-node setting unit 111 sets the root node as a target node (S32).

As illustrated in FIG. 19, the target-node setting unit 111 sets nodes other than an eldest child node among child nodes in the nodes as target nodes (S33).

Specifically, for example, the target-node setting unit 111 sets, as a target node, the node corresponding to "bbaa", which is a node other than the eldest child node, of the node corresponding to "aab" and the node corresponding to "bbaa", which are child nodes in the root node. The target-node setting unit 111 sets, as a target node, the node corresponding to "bc", which is a node other than the eldest child node, of the node corresponding to "bbab" and the node corresponding to "bc", which are child nodes of the node corresponding to "bbaa". The target-node setting unit 111 sets, as a target node, the node corresponding to "bbc", which is a node other than the eldest child node, of the node corresponding to "bbac" and the node corresponding to "bbc", which are child nodes of the node corresponding to "bbab".

Specific Example (1) of Processing for Inserting Data in this Embodiment

A specific example of processing for inserting data is explained. In the following explanation, insertion data including "bba" is inserted into the data structure explained with reference to FIG. 19.

Figure 20A:
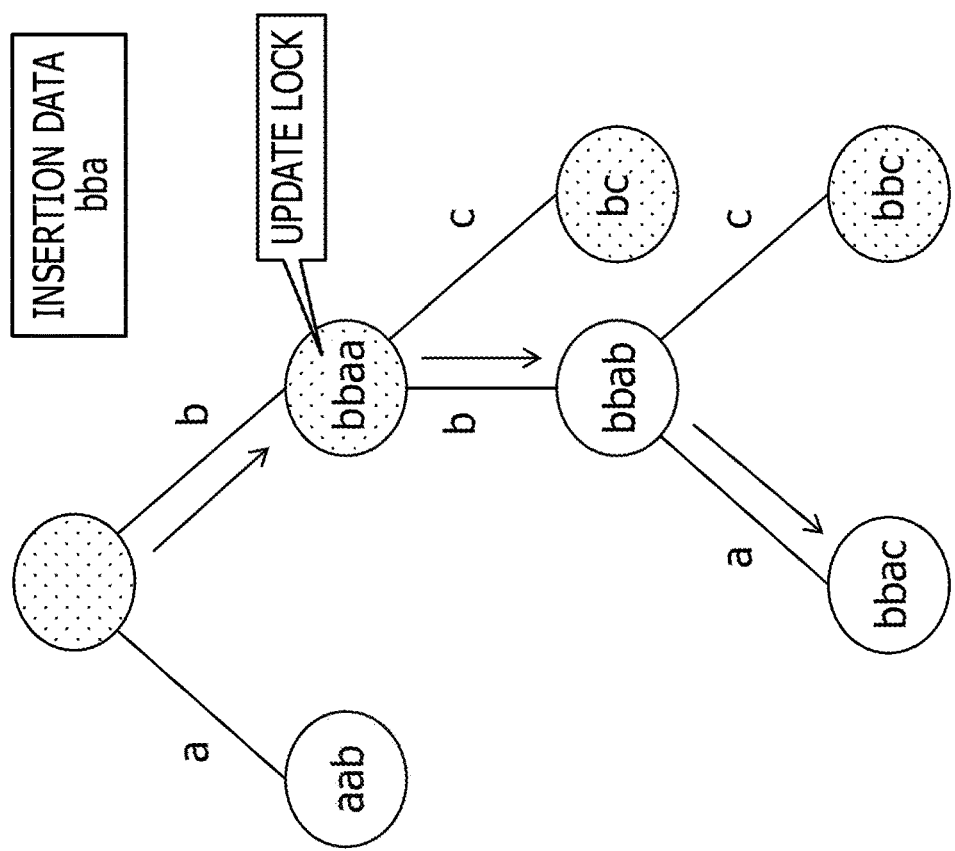
FIGS. 20A and 20B are diagrams for explaining specific examples of the lock control processing in the first embodiment.

When the phase 1-1 is performed, as illustrated in FIG. 20A, the lock executing unit 113 performs lock on the root node, which is the target node (YES in S43, YES in S44, and S51).

That is, for example, when the phase 1-1 is separately performed according to reception of another query from the operation terminal 5, transition of the operation target node is performed in order from the root node. Therefore, the lock executing unit 113 performs lock for the root node first to thereby perform substantial lock for all the nodes included in the data structure illustrated in FIG. 20A.

Figure 20B:
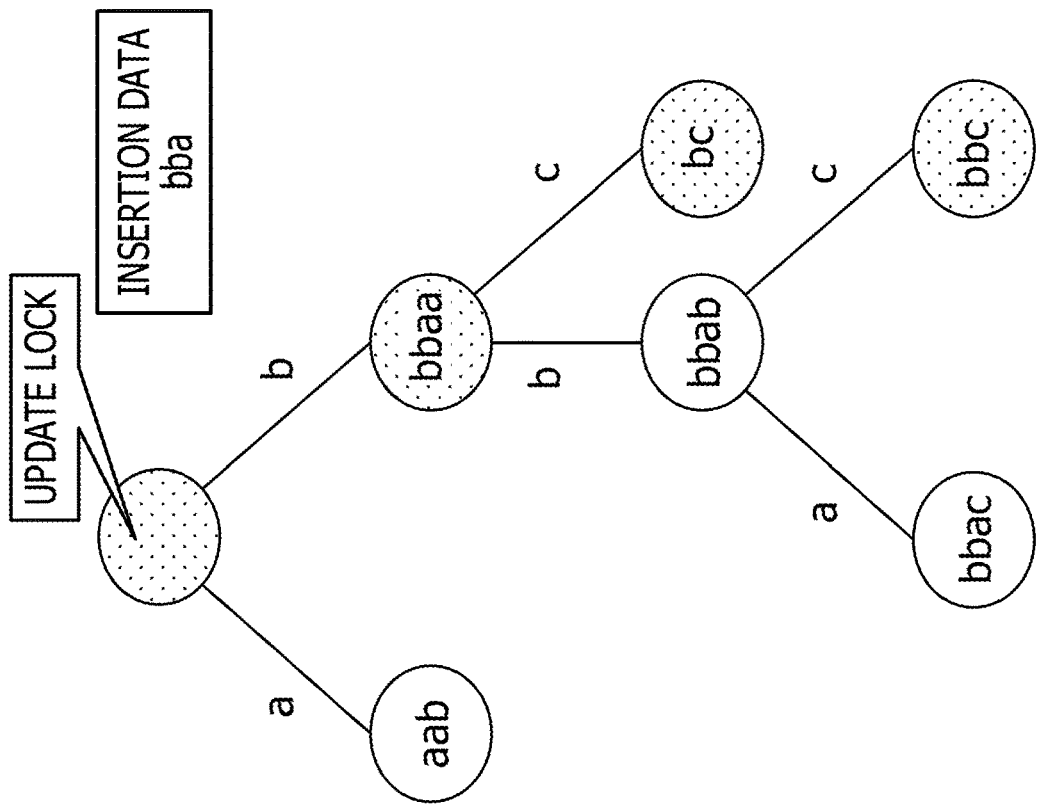

When transition of the operation target node from the root node to the node corresponding to "bbaa" is performed according to the execution of the phase 1-1, as illustrated in FIG. 20B, since the node corresponding to "bbaa" is the target node, the lock executing unit 113 performs lock for the node corresponding to "bbaa" (YES in S43, YES in S44, and S51). In this case, the lock releasing unit 114 releases the lock performed on the root node (YES in S52 and S53).

That is, for example, the node corresponding to "bbaa" is a node other than the eldest child node of the root node. Therefore, when the transition from the root node in the phase 1-1 to the node corresponding to "bbaa" is performed, transition to the root node is not performed in processing (for example, the phase 1-2) performed after the phase 1-1. Therefore, when the transition from the root node to the node corresponding to "bbaa" is performed in the phase 1-1, the management apparatus 1 determines that it is not requested to continue the lock for the root node. Therefore, in this case, the management apparatus 1 performs lock on the node corresponding to "bbaa" and releases the lock for the root node.

Consequently, the management apparatus 1 is capable of minimizing a range of lock of a node performed to reduce occurrence of deadlock. Therefore, the management apparatus 1 enables a plurality of kinds of operation to be performed in parallel on the data included in the data structure of the index 131 and is capable of reducing a lock release waiting time that occurs according to the lock for the node.

Subsequently, when transition from the node corresponding to "bbaa" to the node corresponding to "bbab" is performed according to the execution of the phase 1-1, as illustrated in FIG. 20B, since the node corresponding to "bbab" is not the target node, the lock executing unit 113 does not perform lock for the node corresponding to "bbab" (YES in S43 an NO in S44). In this case, the lock releasing unit 114 does not perform release of the lock performed on the node corresponding to "bbaa" (NO in S52).

That is, for example, the node corresponding to "bbab" is an eldest child node of the node corresponding to "bbaa". Therefore, when the transition from the node corresponding to "bbaa" to the node corresponding to "bbab" is performed in the phase 1-1, in processing (for example, the phase 1-2) performed after the phase 1-1, the transition to "bbaa" is likely to be performed. Therefore, when the transition from the node corresponding to "bbaa" to the node corresponding to "bbab" is performed in the phase 1-1, the management apparatus 1 determines that it is requested to continue the lock for the node corresponding to "bbaa". Therefore, in this case, the management apparatus 1 does not perform release of the lock for the node corresponding to "bbab" and the lock for the node corresponding to "bbaa".

When transition from the node corresponding to "bbab" to the node corresponding to "bbac" is performed according to the execution of the phase 1-1, as illustrate in FIG. 20B, since the node corresponding to "bbac" is not the target node, the lock executing unit 113 does not perform lock for the node corresponding to "bbac" (YES in S43 and NO in S44). In this case, the lock releasing unit 114 does not perform release of the lock performed on the node corresponding to "bbaa" (NO in S52).

Figure 21A:
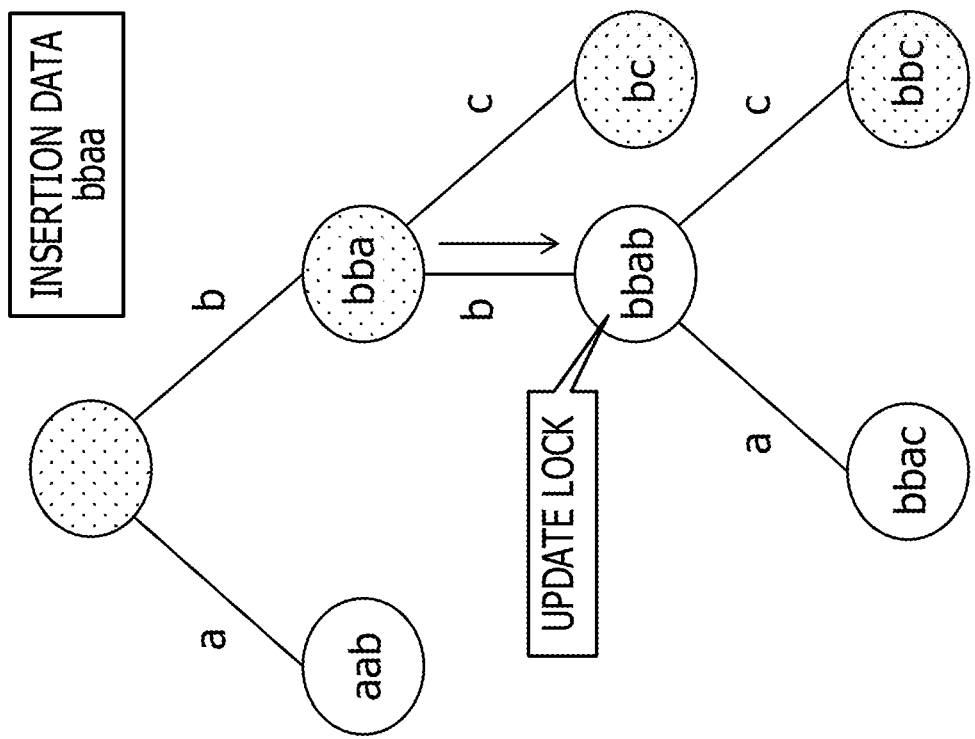
FIGS. 21A and 21B are diagrams for explaining specific examples of the lock control processing in the first embodiment.

As illustrated in FIG. 21A, the lock executing unit 113 does not perform lock for a new node when the phase 1-2 is executed (NO in S42).

That is, for example, the lock executing unit 113 substantially locks all nodes to which the operation target node is likely to be transitioned during the execution of the phase 1-2 according to the execution of the phase 1-1. Therefore, the lock executing unit 113 does not have to perform lock for a new node during execution of the phase 1-2.

Consequently, the management apparatus 1 is capable of stopping lock involved in the execution of the processing (the phase 1-1 or the phase 1-3) for passing through the nodes from the parent node to the child nodes and lock involved in the execution of the processing (the phase 1-2) for passing through the nodes from the child nodes to the parent node from being performed in parallel. Therefore, the management apparatus 1 enables a plurality of kinds of operation to be performed in parallel on the data included in the data structure of the index 131 and is capable of reducing occurrence of deadlock.

Figure 21B:
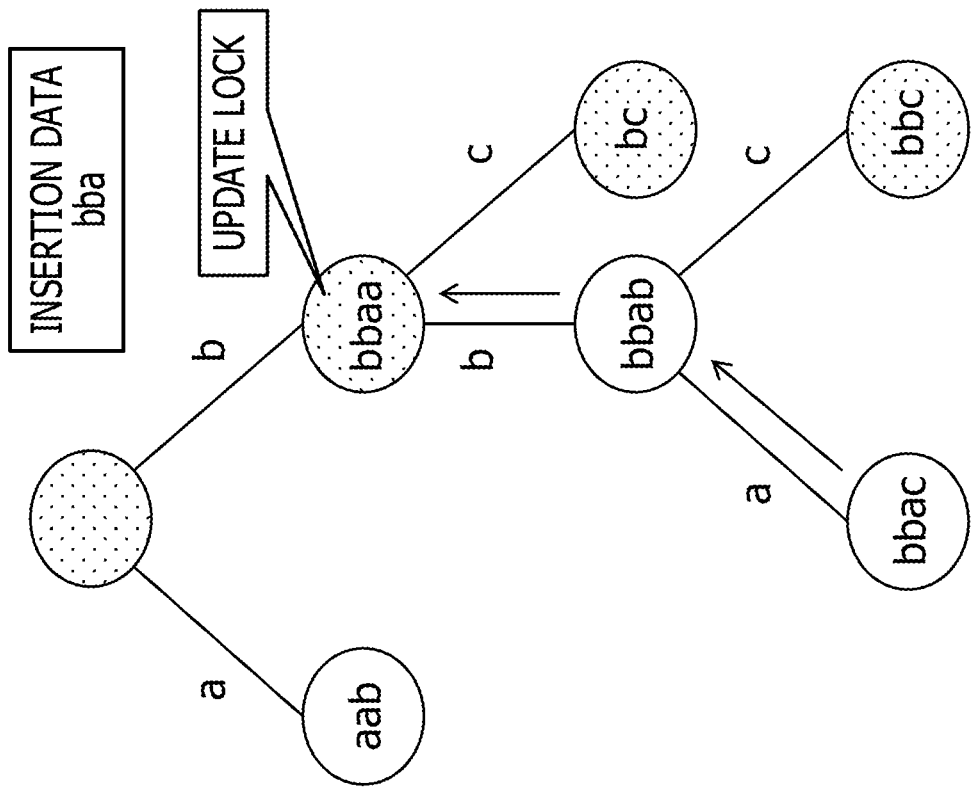

Subsequently, as illustrated in FIG. 21B, when transition from the node corresponding to "bba" (a node associated with "bba", which is the insertion data) to the node corresponding to "bbab" is performed according to the execution of the phase 1-3, as illustrated in FIG. 21B, the lock executing unit 113 performs lock for the node corresponding to "bbab" (NO in S43 and S51). The lock releasing unit 114 releases the lock performed on the node corresponding to "bba" (YES in S52 and S53).

That is, for example, after the phase 1-3, processing for transition to the node corresponding to "bba" is not performed. Therefore, when the transition from the node corresponding to "bba" to the node corresponding to "bbab" is performed in the phase 1-3, the management apparatus 1 determines that it is not requested to continue the lock for the node corresponding to "bba" irrespective of whether the node corresponding to "bbab" is an eldest child node. Therefore, in this case, the lock releasing unit 114 performs lock for the node corresponding to "bbab" and releases the lock for the node corresponding to "bba".

Consequently, the management apparatus 1 is capable of minimizing a range of lock of nodes performed for reducing occurrence of deadlock. Therefore, the management apparatus 1 enables a plurality of kinds of operation to be performed in parallel for the data included in the data structure of the index 131 and is capable of reducing a lock release waiting time that occurs according to the lock for the node.

Figure 22B:
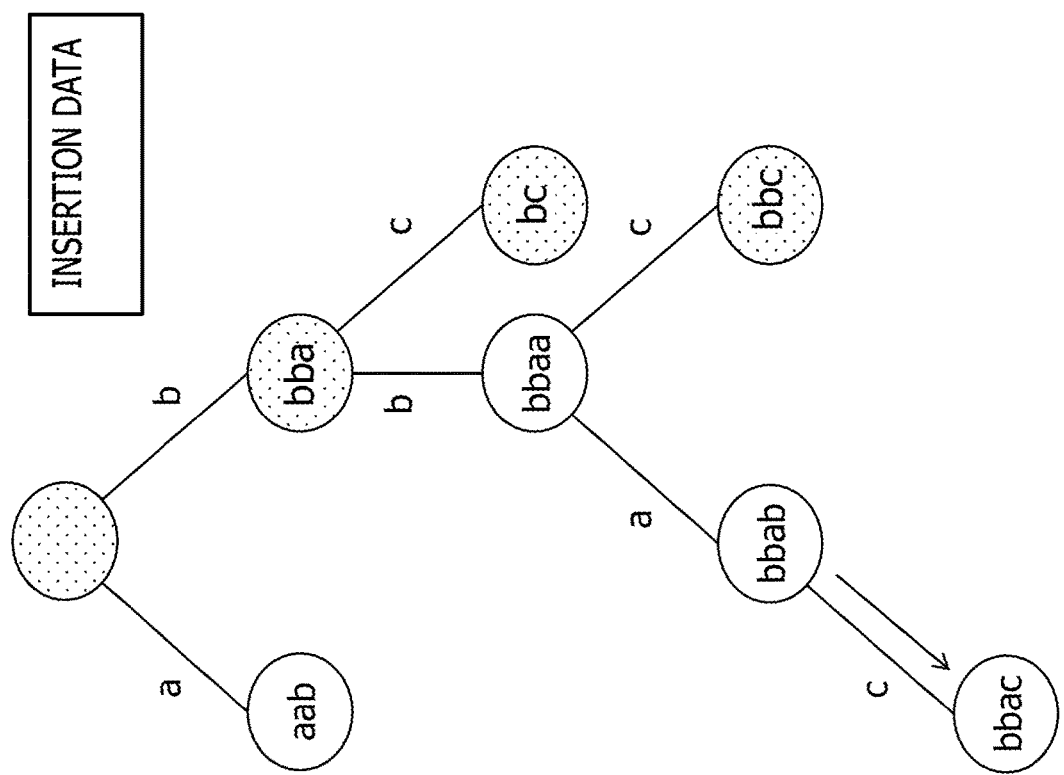
FIGS. 22A and 22B are diagrams for explaining specific examples of the lock control processing in the first embodiment.
Figure 22A:
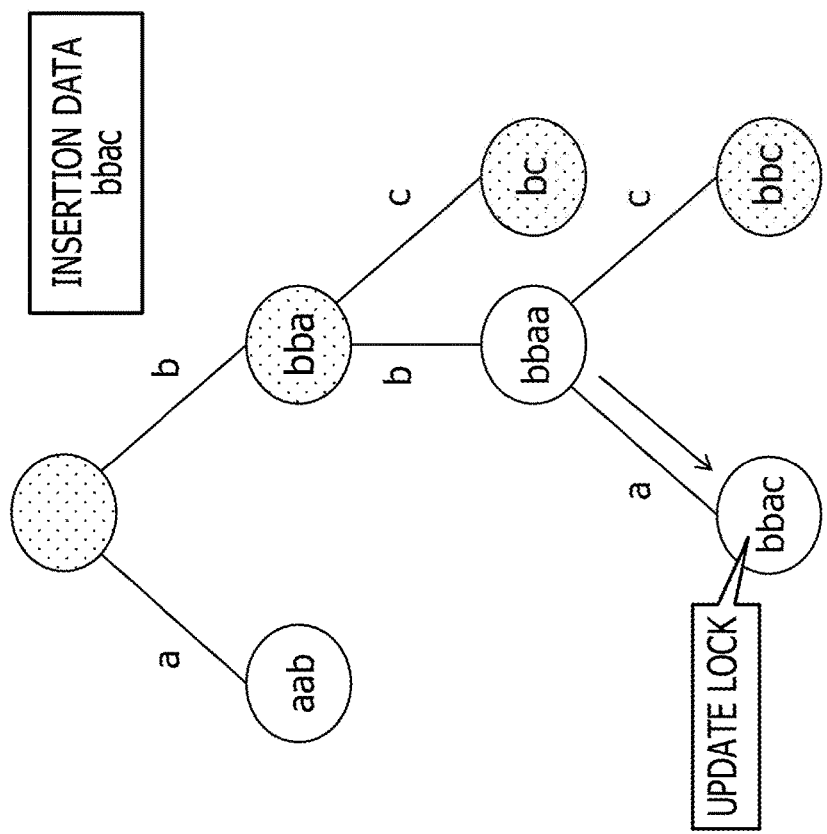

As illustrated in FIG. 22A, when transition from the node corresponding to "bbaa" (the node associated with "bbaa", which is the insertion data) to the node corresponding to "bbac" is performed according to the execution of the phase 1-3, the lock executing unit 113 performs lock for the node corresponding to "bbac" (NO in S43 and S51). In this case, the lock releasing unit 114 releases the lock performed on the node corresponding to "bbaa" (YES in S52 and S53).

Thereafter, as illustrated in FIG. 22B, the lock releasing unit 114 releases the lock for the node corresponding to "bbab" (the node associated with "bbab", which is the insertion data) according to the execution of the processing corresponding to the phase 1-4.

Specific Example (1) of the Processing for Deleting Data in this Embodiment

A specific example of the processing for deleting data is explained. In the following explanation, deletion of deletion data including "bbaa" among the data included in the data structure explained with reference to FIG. 19 is performed.

Figure 23A:
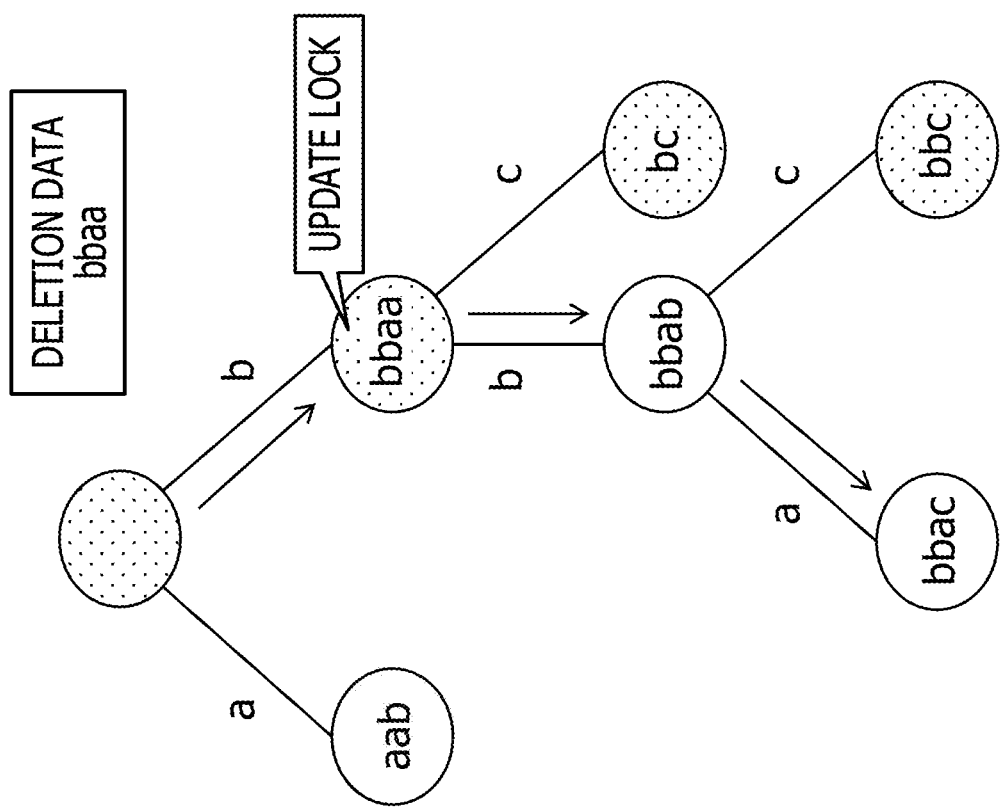
FIGS. 23A and 23B are diagrams for explaining specific examples of the lock control processing in the first embodiment.

When the phase 2-1 is performed, as illustrated in FIG. 23A, the lock executing unit 113 performs lock on the root node, which is the target node (YES in S43, YES in S44, and S51).

Figure 23B:
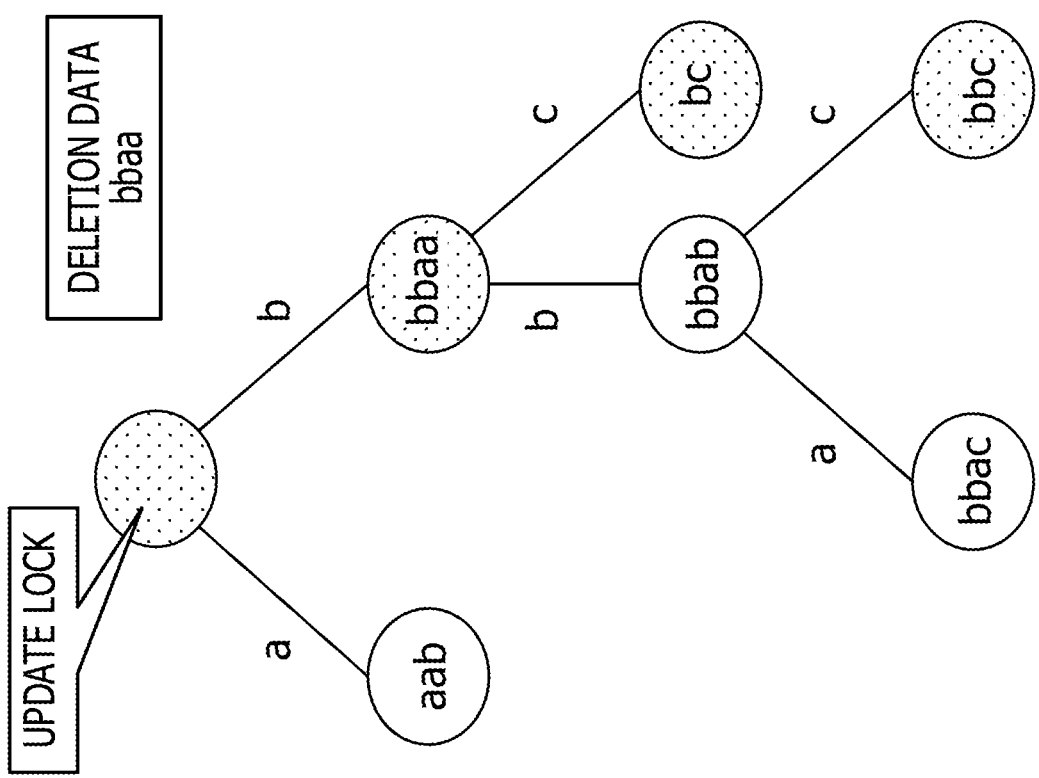

When transition from the root node to the node corresponding to "bbaa" is performed according to the execution of the phase 2-1, as illustrated in FIG. 23B, since the node corresponding to "bbaa" is the target node, the lock executing unit 113 performs lock for the node corresponding to "bbaa" (YES in S43, YES in S44, and S51). In this case, the lock releasing unit 114 releases the lock performed on the root node (YES in S52 and S53).

When transition from the node corresponding to "bbaa" to the node corresponding to "bbab" is performed according to the execution of the phase 2-1, as illustrated in FIG. 23B, since the node corresponding to "bbab" is not the target node, the lock executing unit 113 does not perform lock for the node corresponding to "bbab" (YES in S43 and NO in S44). In this case, the lock releasing unit 114 does not perform release of the lock performed on the node corresponding to "bbaa" (NO in S52).

Subsequently, when transition from the node corresponding to "bbab" to the node corresponding to "bbac" is performed according to the execution of the phase 2-1, as illustrated in FIG. 23B, since the node corresponding to "bbac" is not the target node, the lock executing unit 113 does not perform lock for the node corresponding to "bbac" (YES in S43 and NO in S44). In this case, the lock releasing unit 114 does not perform release of the lock performed on the node corresponding to "bbac" (NO in S52).

Figure 24A:
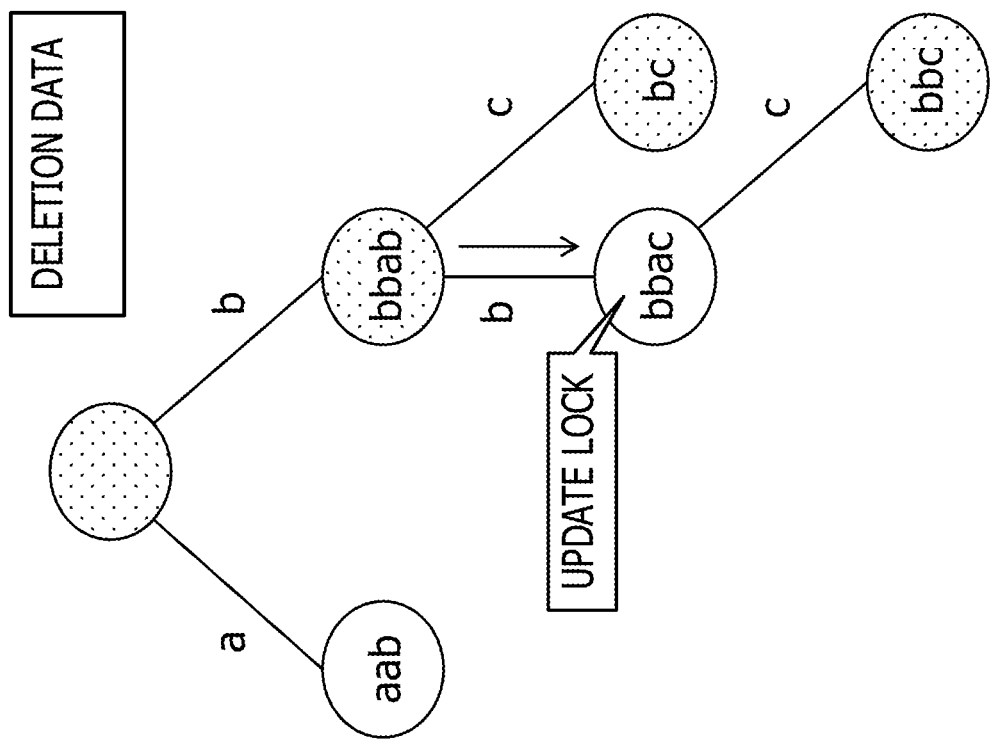
FIGS. 24A and 24B are diagrams for explaining specific examples of the lock control processing in the first embodiment.

Subsequently, as illustrated in FIG. 24A, when the phase 2-2 is executed, the lock executing unit 113 does not perform lock for a new node (NO in S42).

Figure 24B:
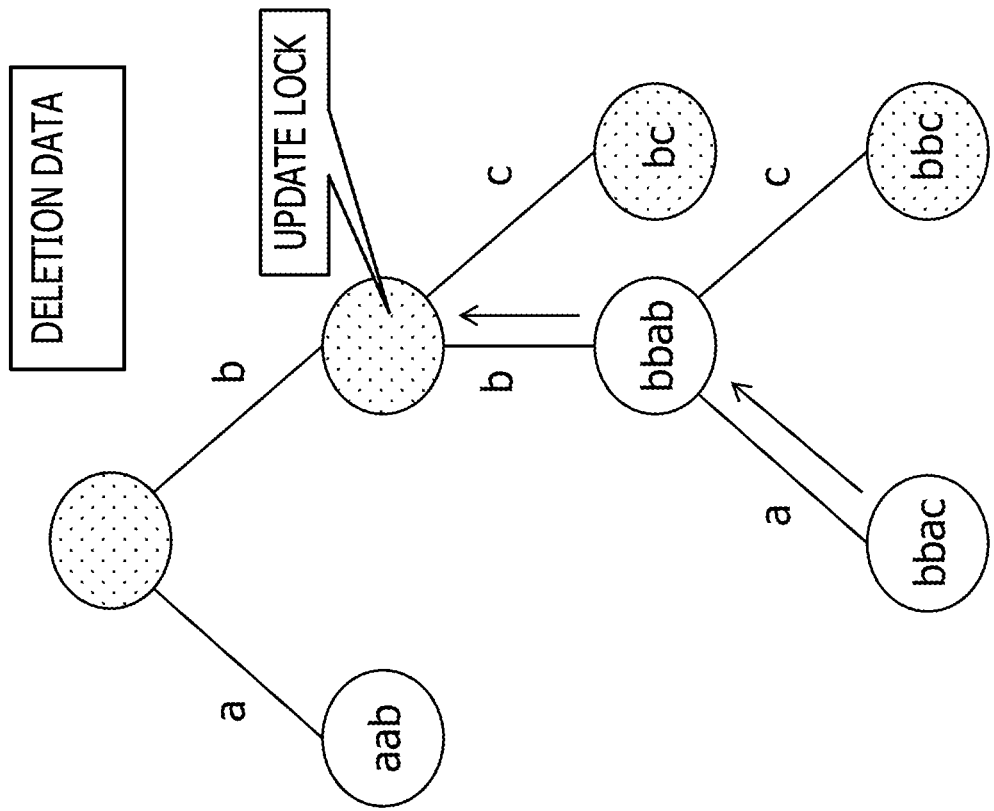

Thereafter, as illustrated in FIG. 24B, when transition from the node corresponding to "bbab" (a node associated with "bba" anew) to the node corresponding to "bbac" (a node associated with "bbac" anew) is performed according to the execution of the phase 2-3, the lock executing unit 113 performs lock for the node corresponding to "bbac" (NO in S43 and S51). In this case, the lock releasing unit 114 releases the lock performed on the node corresponding to "bbab" (YES in S52 and S53).

Specific Example (2) of the Target Nodes

Another specific example of the target nodes is explained.

Figure 7:
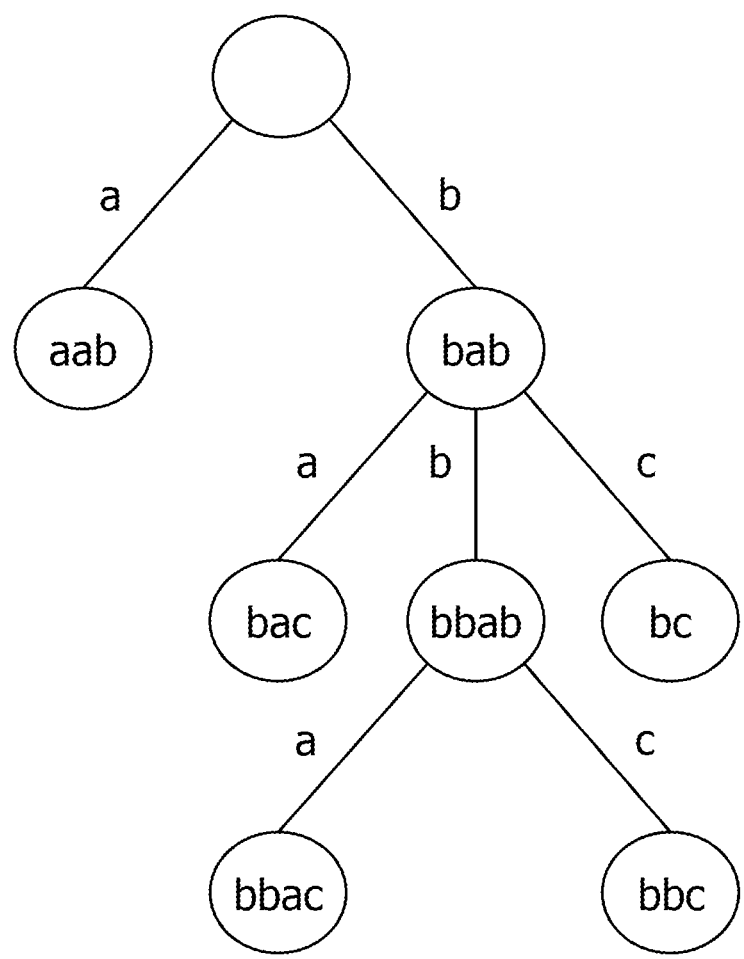
FIG. 7 is a diagram for explaining a specific example of the data structure of the index.
Figure 25:
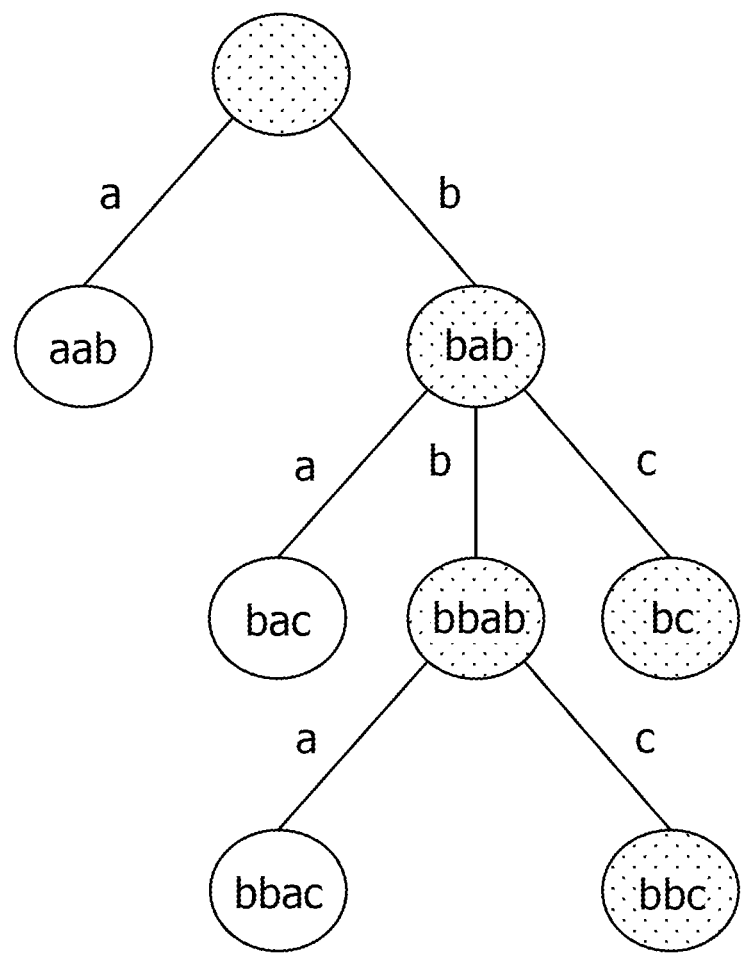
FIG. 25 is another specific example for explaining setting of target nodes for the data structure explained with reference to FIG. 7.

FIG. 25 is a specific example for explaining setting of the target nodes for the data structure explained with referenced to FIG. 7.

As illustrated in FIG. 25, the target-node setting unit 111 sets the root node as a target node (S32).

As illustrated in FIG. 25, the target-node setting unit 111 sets, as target nodes, child nodes other than the eldest child node among the child nodes of the nodes (S33).

Specifically, for example, the target-node setting unit 111 sets, as a target node, the node corresponding to "bab", which is a node other than the eldest child node, of the node corresponding to "aab" and the node corresponding to "bab", which are the child nodes of the root node. The target-node setting unit 111 sets, as target nodes, the node corresponding to "bbab" and the node corresponding to "bc", which are nodes other than the eldest child node, among the node corresponding to "bac", which is a child node of the node corresponding to "bab", the node corresponding to "bbab", and the node corresponding to "bc". The target-node setting unit 111 sets, as a target node, the node corresponding to "bbc", which is a node other than the eldest child node, of the node corresponding to the "bbac" and the node corresponding to "bbc", which are the child nodes of the node corresponding to "bbab".

Specific Example (2) of the Processing for Inserting Data in this Embodiment

A specific example of processing for inserting data is explained. In the following explanation, insertion data including "bba" is inserted into the data structure explained with reference to FIG. 2.

Figure 26A:
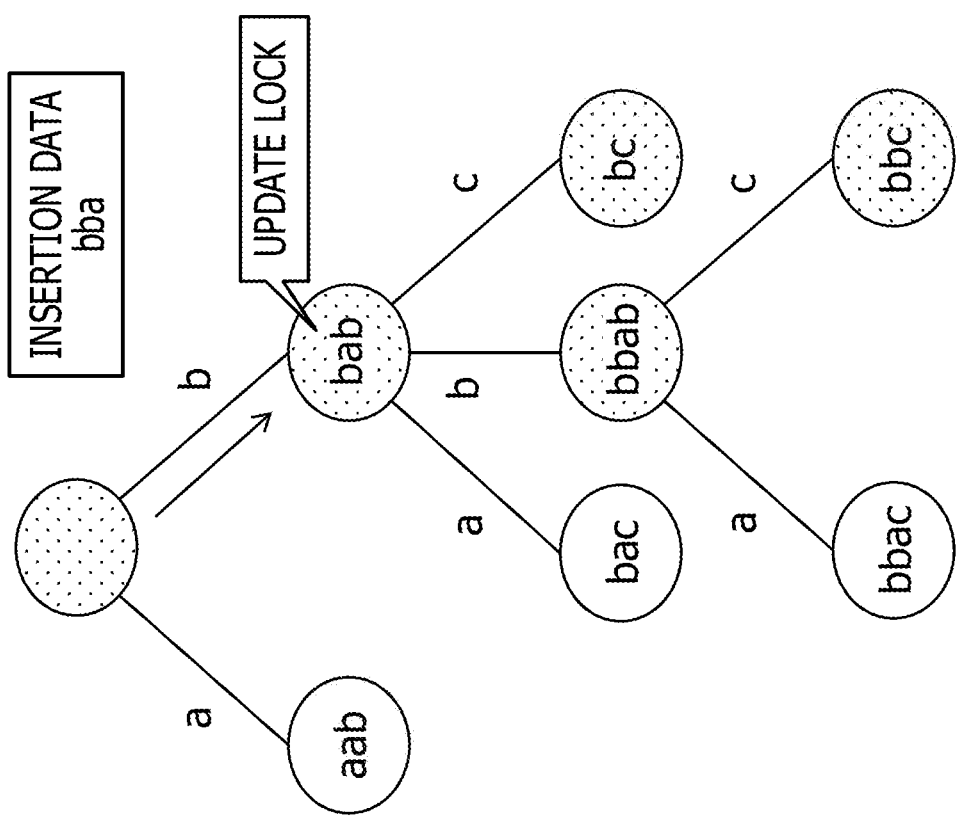
FIGS. 26A and 26B are diagrams for explaining specific examples of the lock control processing in the first embodiment.

When the phase 1-1 is performed, as illustrated in FIG. 26A, the lock executing unit 113 performs lock for the root node, which is the target node (YES in S43, YES in S44, and S51).

Figure 26B:
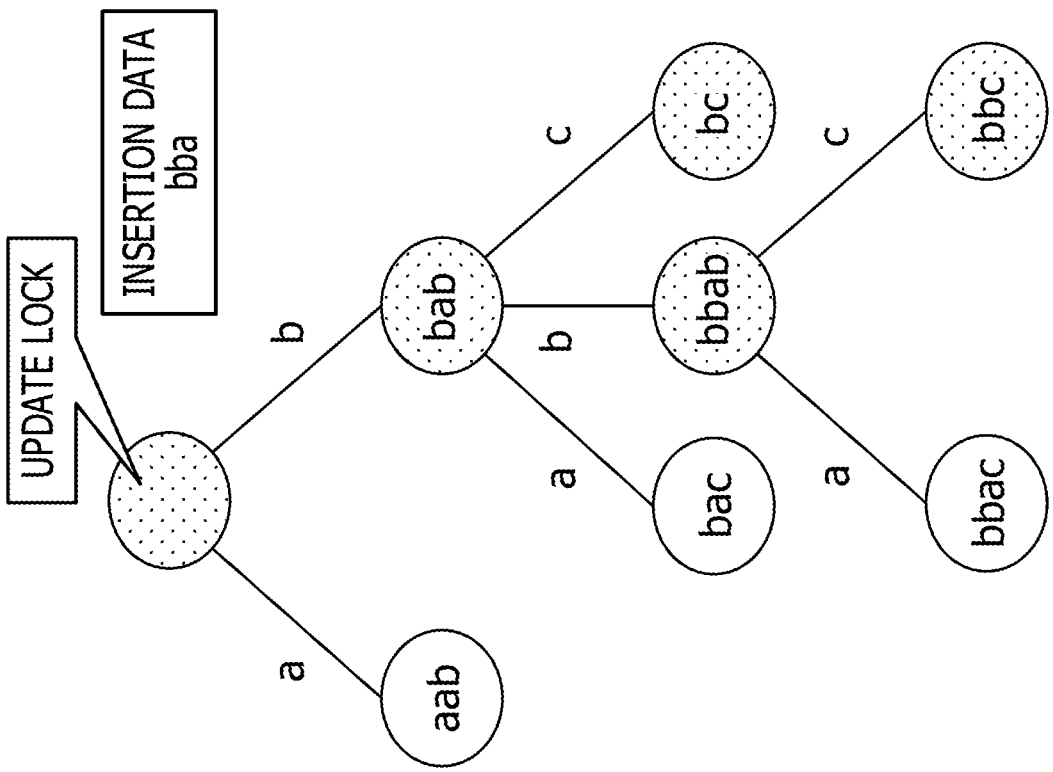

When transition from the root node to the node corresponding to "bab" is performed according to the execution of the phase 1-1, as illustrated in FIG. 26B, since the node corresponding to "bab" is the target node, the lock executing unit 113 performs lock for the node corresponding to "bab" (YES in S43, YES in S44, and S51). In this case, the lock releasing unit 114 releases the lock performed on the root node (YES in S52 and S53).

Figure 27A:
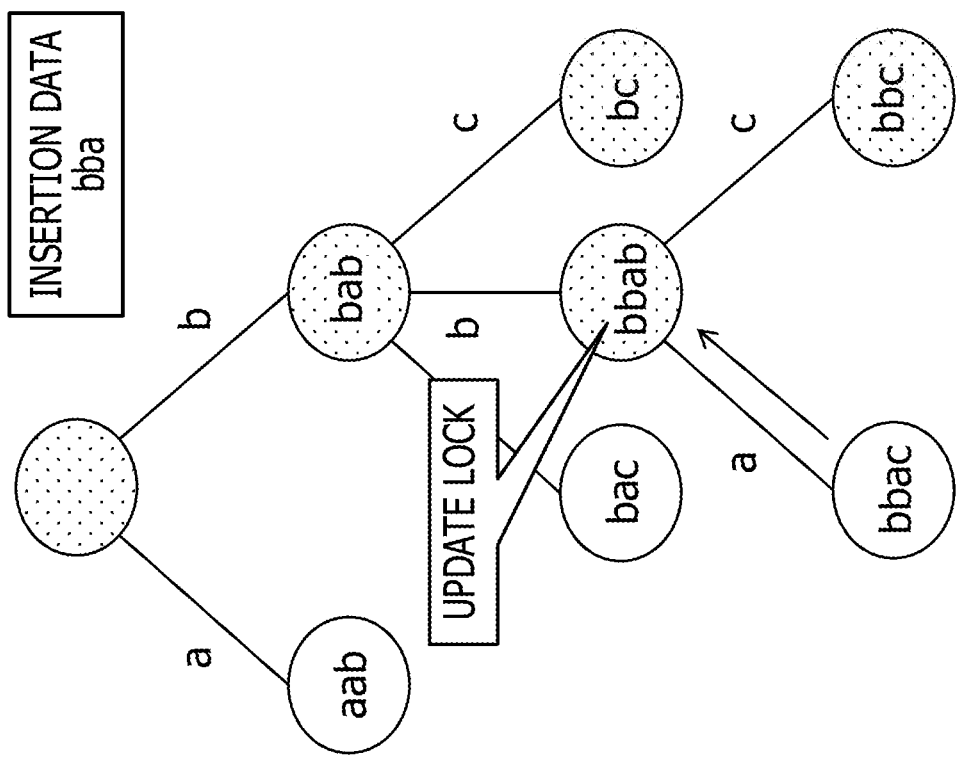
FIGS. 27A and 27B are diagrams for explaining specific examples of the lock control processing in the first embodiment.

Subsequently, when transition from the node corresponding to "bab" to the node corresponding to "bbab" is performed according to the execution of the phase 1-1, as illustrated in FIG. 27A, since the node corresponding to "bbab" is the target node, the lock executing unit 113 performs lock for the node corresponding to "bbab" (YES in S43, YES in S44, and S51). In this case, the lock releasing unit 114 releases the lock performed on the node corresponding to "bab" (YES in S52 and S53).

Subsequently, when transition from the node corresponding to "bbab" to the node corresponding to "bbac" is performed according to the execution of the phase 1-1, as illustrated in FIG. 27A, since the node corresponding to "bbac" is not the target node, the lock executing unit 113 does not perform lock for the node corresponding to "bbac" (YES in S43 and NO in S44). In this case, the lock releasing unit 114 does not perform release of the lock performed on the node corresponding to "bbac" (NO in S52).

Figure 27B:
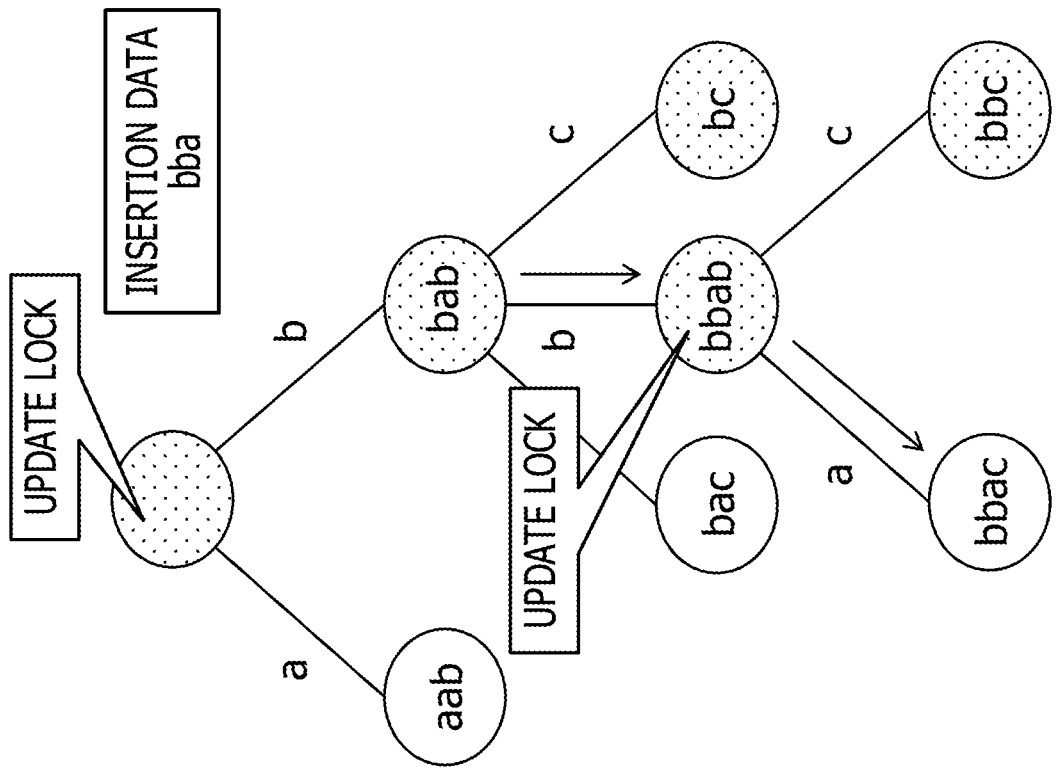

As illustrated in FIG. 27B, when the phase 1-2 is executed, the lock executing unit 113 does not perform lock for a new node (NO in S42).

Figure 28A:
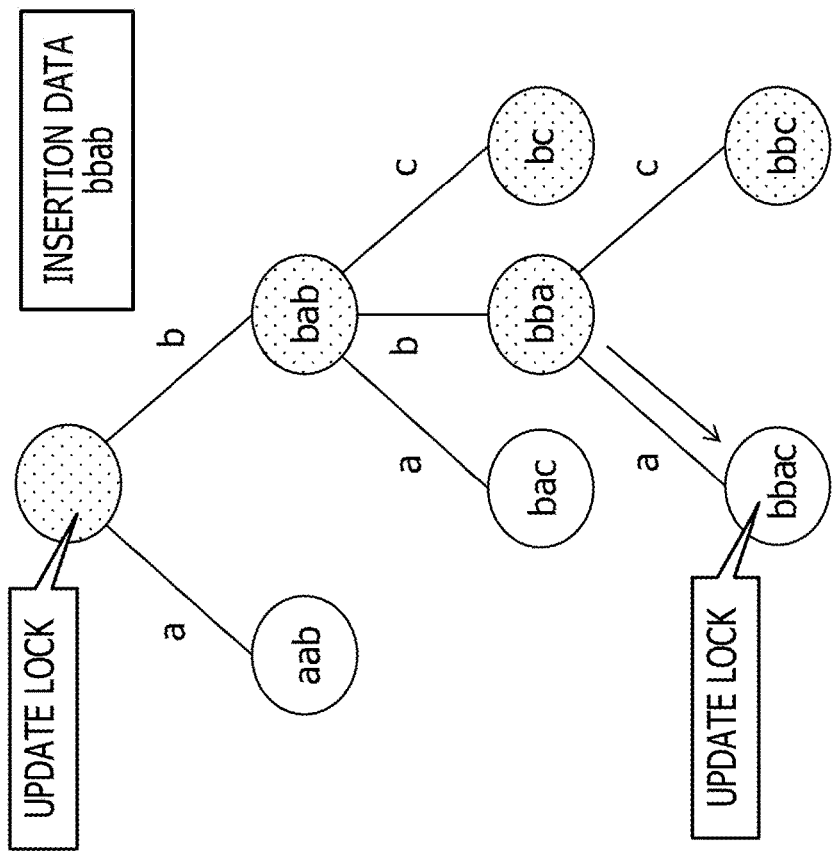
FIGS. 28A and 28B are diagrams for explaining specific examples of the lock control processing in the first embodiment.

Subsequently, as illustrated in FIG. 28A, when transition from the node corresponding to "bba" (the node associated with "bba", which is the insertion data) to the node corresponding to "bbac" is performed according to the execution of the phase 1-3, the lock executing unit 113 performs lock for the node corresponding to "bbac" (NO in S43 and S51). In this case, the lock releasing unit 114 releases the lock performed on the node corresponding to "bba" (YES in S52 and S53).

Figure 28B:
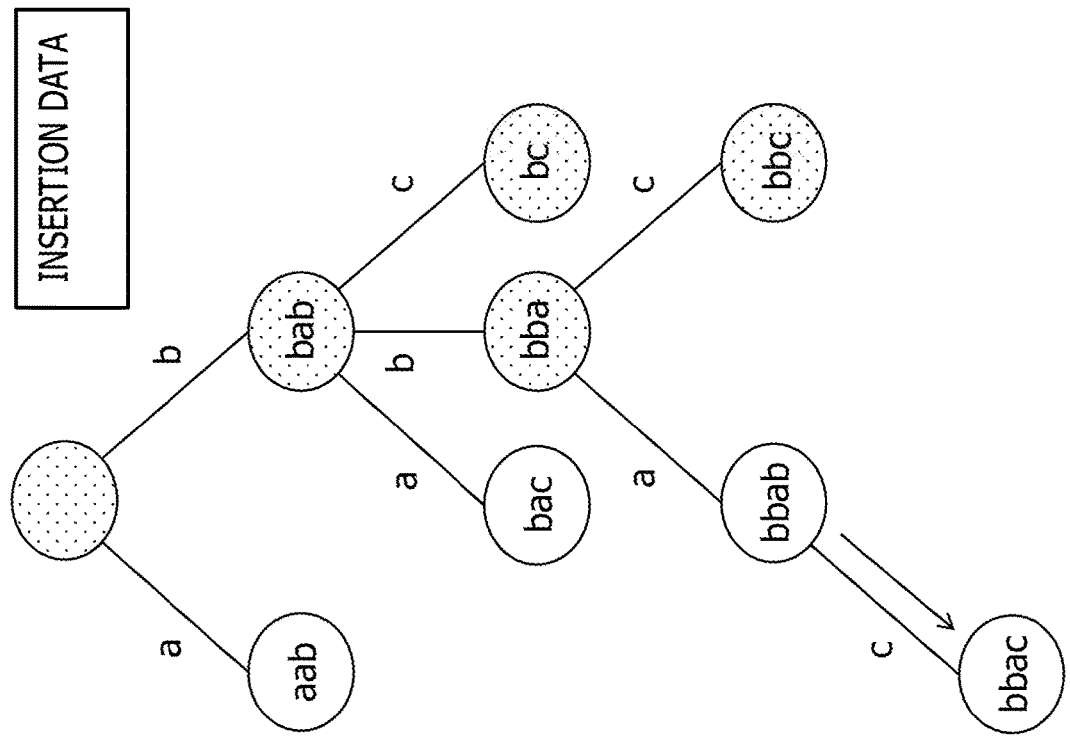

Thereafter, according to the execution of the processing corresponding to the phase 1-4, as illustrated in FIG. 28B, the lock releasing unit 114 releases the lock performed on the node corresponding to "bbab" (the node associated with "bbab", which is the insertion data).

Specific Example (2) of the Processing for Deleting Data in this Embodiment

A specific example of the processing for deleting data is explained. In the following explanation, deletion of deletion data including "bbab" among the data included in the data structure explained with reference to FIG. 19 is performed.

Figure 29A:
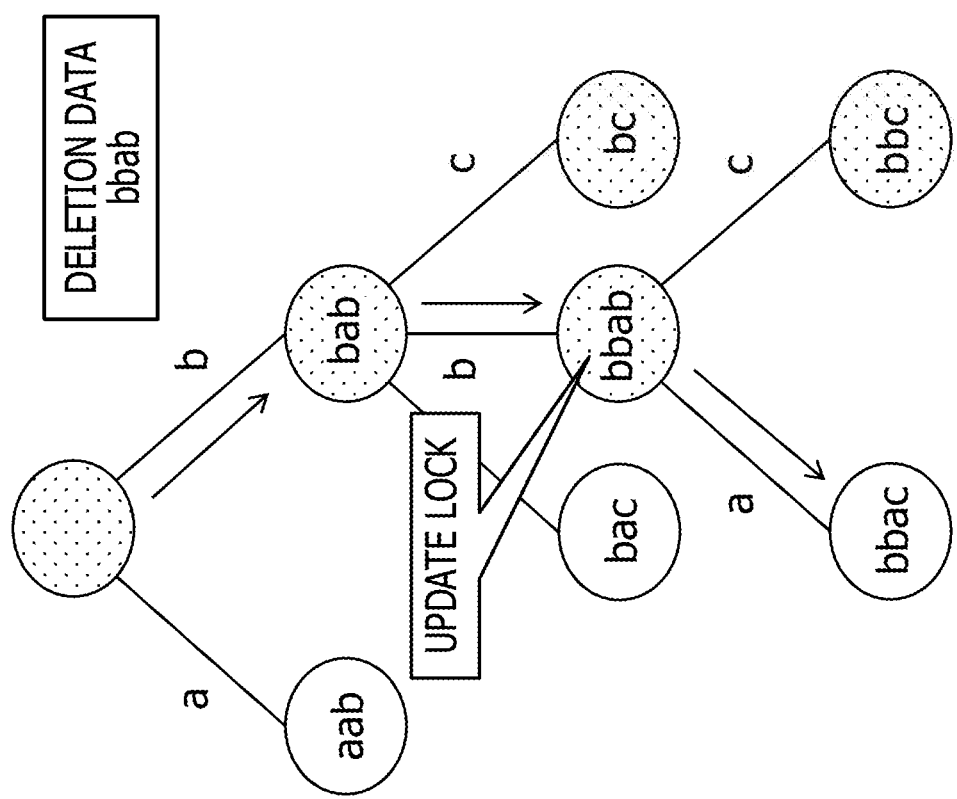
FIGS. 29A and 29B are diagrams for explaining specific examples of the lock control processing in the first embodiment.

When the phase 2-1 is performed, as illustrated in FIG. 29A, the lock executing unit 113 performs lock on the root node, which is the target node (YES in S43, YES in S44, and S51).

When transition from the root node to the node corresponding to "bob" is performed according to the execution of the phase 2-1, since the node corresponding to "bob" is the target node, the lock executing unit 113 performs lock for the node corresponding to "bob" (YES in S43, YES in S44, and S51). In this case, the lock releasing unit 114 releases the lock performed on the root node (YES in S52 and S53).

Figure 29B:
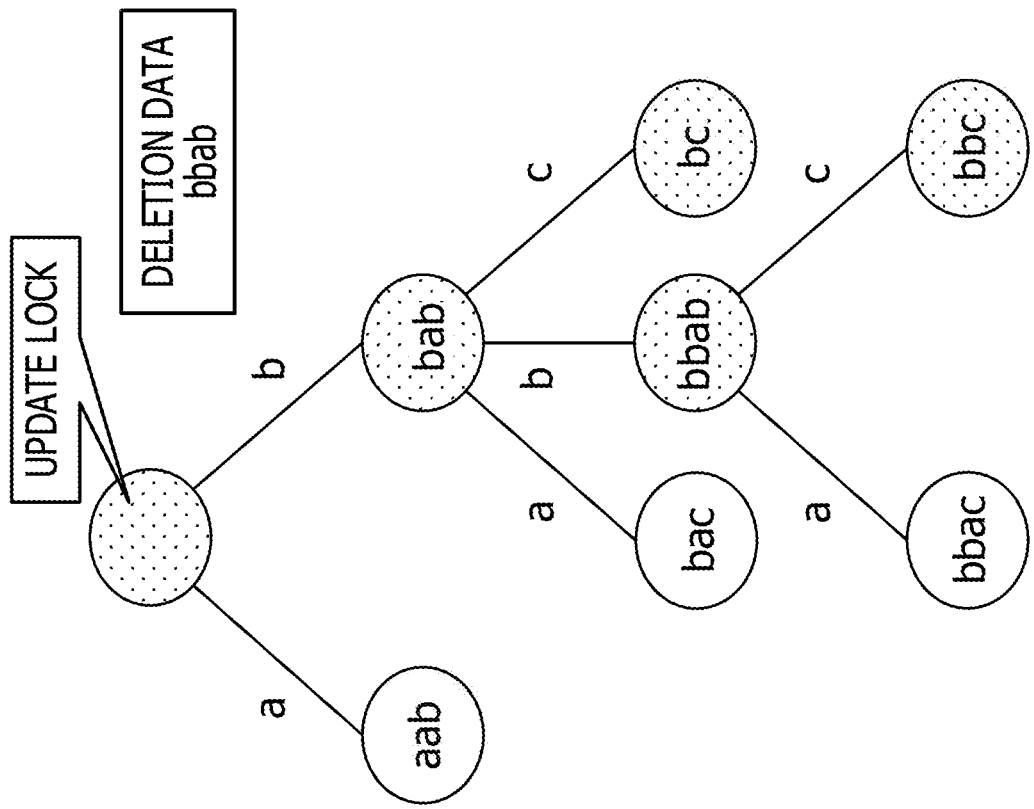

Subsequently, when transition from the node corresponding to "bab" to the node corresponding to "bbab" is performed according to the execution of the phase 2-1, as illustrated in FIG. 29B, since the node corresponding to "bbab" is the target node, the lock executing unit 113 performs lock for the node corresponding to "bbab" (YES in S43, YES in S44, and S51). In this case, the lock releasing unit 114 releases the lock performed on the node corresponding to "bab" (YES in S52 and S53).

When transition from the node corresponding to "bbab" to the node corresponding to "bbac" is performed according to the execution of the phase 2-1, as illustrated in FIG. 29B, since the node corresponding to "bbac" is not the target node, the lock executing unit 113 does not perform lock for the node corresponding to "bbac" (YES in S43 and NO in S44). In this case, the lock releasing unit 114 does not perform release of the lock performed on the node corresponding to "bbac" (NO in S52).

Figure 30A:
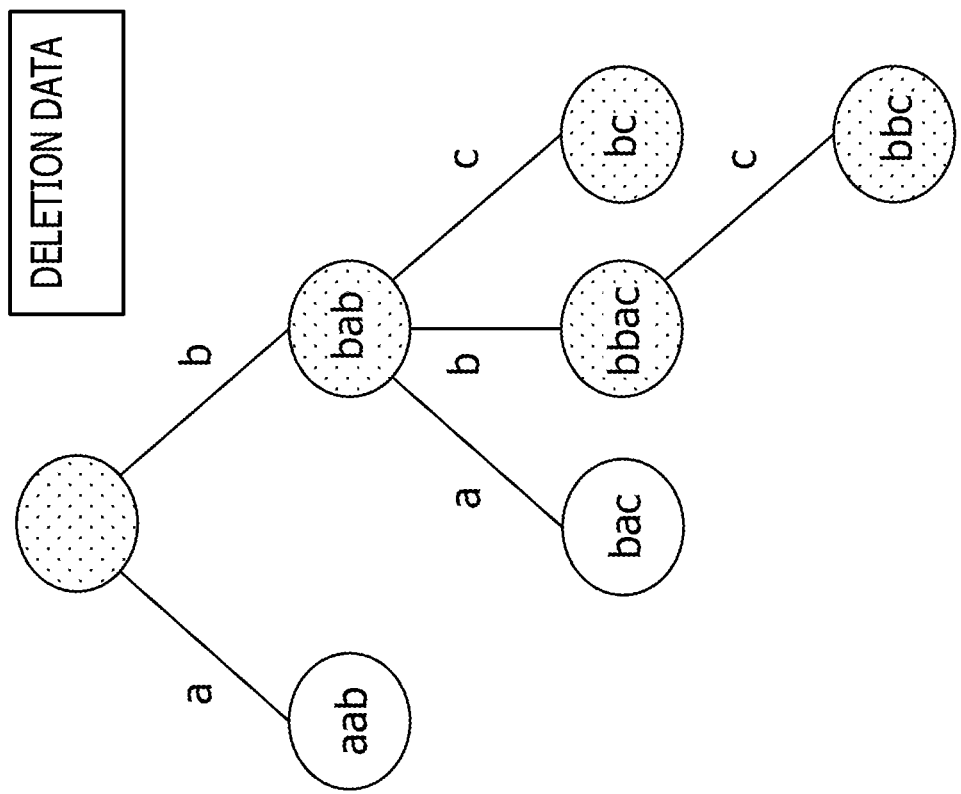
FIGS. 30A and 30B are diagrams for explaining specific examples of the lock control processing in the first embodiment.

Subsequently, as illustrated in FIG. 30A, when the phase 2-2 is executed, the lock executing unit 113 does not perform lock for a new node (NO in S42).

Figure 30B:
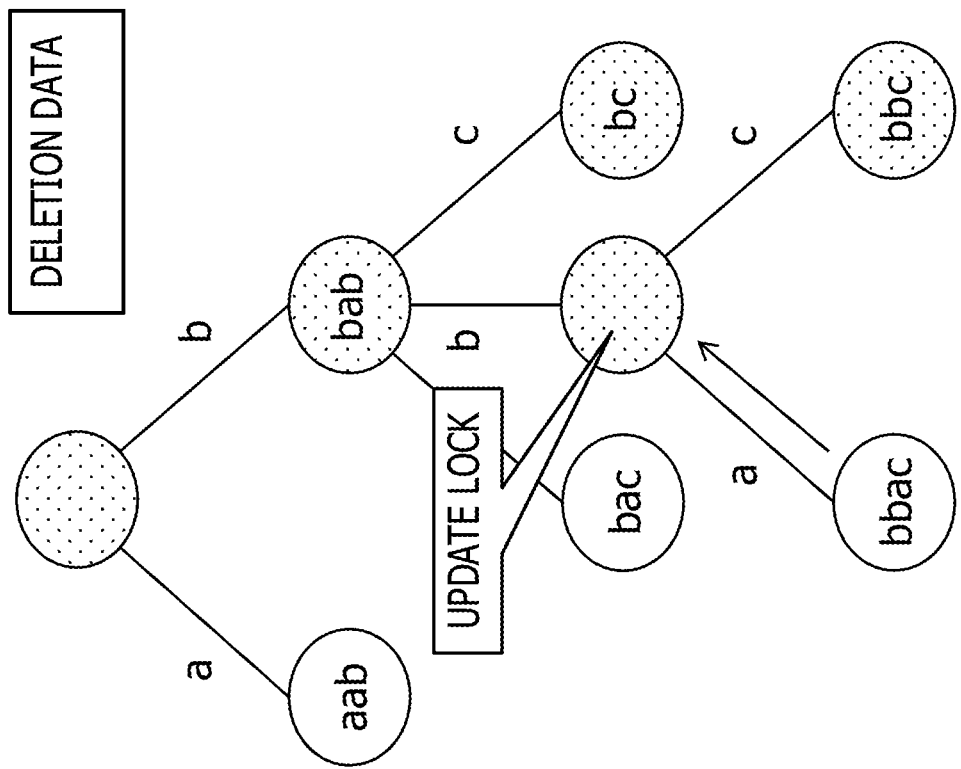

Thereafter, according to the execution of the phase 2-3, as illustrated in FIG. 30B, the lock releasing unit 114 releases the lock performed on the node corresponding to "bbac" (the node associated with "bbac" anew) (YES in S52 and S53).

In this way, the management apparatus 1 in this embodiment sets, as the target nodes in performing the lock control, the child nodes other than the eldest child node among the child nodes corresponding to each of the parent nodes in the layers of the data structure configured by the tree structure. When operation is performed on the data associated with the nodes in the data structure, the management apparatus 1 performs lock on the target nodes when performing the processing for passing through the target nodes from the parent node to the child nodes.

That is, for example, when the processing performed from data corresponding to a higher-level node toward data corresponding to a lower-level node is performed, the management apparatus 1 performs lock for nodes required during the execution of the processing. In this case, the management apparatus 1 also performs lock for nodes required during the execution of the processing performed from data corresponding to a lower-level node toward data corresponding to a higher-level node. When the processing performed from data corresponding to a lower-level node toward data corresponding to a higher-level node is performed, the management apparatus 1 does not perform lock for nodes required during the execution of the processing.

Consequently, the management apparatus 1 is capable of performing a plurality of kinds of operation for data in parallel while reducing occurrence of deadlock. Therefore, the management apparatus 1 is capable of efficiently performing the kinds of operation for the data.

For example, when search for data included in the data structure of the index 131 is performed according to reception of a query from the operation terminal 5, the lock executing unit 113 may perform reference lock for the nodes. Consequently, the management apparatus 1 is capable of further reducing the lock release waiting time that occurs according to the lock for the nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A lock control apparatus comprising:
one or more memories; and
one or more processors coupled to the one or more memories, the one or more processors being configured to:
perform setting of, as a target node, each of one or more child nodes other than eldest child nodes among child nodes in a respective traversal path of a tree structure, wherein each layer of the tree structure is associated with deeper data in lexicographic order of the child nodes than data associated with a corresponding parent node; and
in response to receiving of an operation request for first data, obtain a first locked node by performing lock of a root node in the tree structure, and perform, repeatedly, processing until a processing target is reached, the processing being configured to:
perform a first processing that proceeds in a first direction from the first locked node to a child node of the first locked node towards the processing target;
while the first processing is proceeding in the first direction of the respective traversal path, obtain a determination result by performing determination of whether the child node is the processing target as the target node;
in response to the determination result indicating that the child node is the processing target as the target node, obtain a second locked node by performing lock of the child node as the processing target and performing release the first locked node;
in response to the determination result indicating that the child node as the processing target is not the target node, do not obtain the second locked node to maintain a state that the first locked node remains locked;
while the first processing is proceeding in the first direction, determine whether a second processing should be performed proceeding in a second direction of the respective traversal path from the child node to the parent node;
in response to the determining that the second processing is not to be performed, obtain the second locked node by performing lock of the child node and performing release the first locked node;
in response to the determining that the second processing is to be performed, determine whether the processing target in the second processing is an upper node at a higher layer than the child node along the respective traversal path;
in response to the determining that the processing target in the second processing is to be proceeded to an upper node than the child node, do not obtain the second locked node and reconstitute a state of the first locked node;
in response to the determining that the processing target in the second processing is not to be proceeded to an upper node than the child node, obtain the second locked node by performing lock of the child node and performing release the first locked node; and
executing the operation request on the first locked node or second locked node.

2. The lock control apparatus according to claim 1, wherein one or more data associated with one or more branches from the root node and the child node to be the processing target in the tree structure are included in a head of the first data in order of the one or more branches, and each data is associated with each node included in the tree structure in such a way that each data is searched in lexicographic order in depth preferential search.

3. The lock control apparatus according to claim 2, wherein the tree structure is a Full Blossom Tree.

4. The lock control apparatus according to claim 1, wherein the setting includes setting, as the target node, each of a first node other than the root node, and a second node which is the child node of the first node, and wherein the one or more processors are configured to, in a state where the first node is locked, perform an additional process for second data associated with the second node proceeding in a direction from the first node to the second node, perform lock of the second node, and release the first node from the lock.

5. The lock control apparatus according to claim 1, wherein the one or more processors are configured to use the first locked node to not perform lock of each processing target in the second processing, when performing the second processing for the first data proceeding in a direction from the child nodes to the parent node.

6. The lock control apparatus according to claim 1, wherein the operation request is one of search of data, insertion of data, and deletion of data.

7. A computer-implemented lock control method comprising:
   setting, as a target node, each of one or more child nodes other than eldest child nodes among child nodes in a respective traversal path of a tree structure, wherein each layer of the tree structure is associated with deeper data in lexicographic order of the child nodes than data associated with a corresponding parent node; and
   in response to receiving of an operation request for first data, obtaining a first locked node by performing lock of a root node in the tree structure and repeatedly processing until a processing target is reached, the repeatedly processing comprising:
      performing a first processing that proceeds in a first direction from the first locked node to a child node of the first locked node towards the processing target;
      while the first processing is proceeding in the first direction of the respective traversal path, obtaining a determination result by performing determination of whether the child node is the processing target as the target node;
      in response to the determination result indicating that the child node is the processing target as the target node, obtaining a second locked node by performing lock of the child node as the processing target and performing release the first locked node;
      in response to the determination result indicating that the child node as the processing target is not the target node, not obtaining the second locked node to maintain a state that the first locked node remains locked;
      while the first processing is proceeding in the first direction, determining whether a second processing should be performed proceeding in a second direction of the respective traversal path from the child node to the parent node;
      in response to the determining that the second processing is not to be performed, obtaining the second locked node by performing lock of the child node and performing release the first locked node;
      in response to the determining that the second processing is to be performed, determining whether the processing target in the second processing is an upper node at a higher layer than the child node along the respective traversal path;
      in response to the determining that the processing target in the second processing is to be proceeded to an upper node than the child node, not obtaining the second locked node and reconstituting a state of the first locked node;
      in response to the determining that the processing target in the second processing is not to be proceeded to an upper node than the child node, obtaining the second locked node by performing lock of the child node and performing release the first locked node; and
      executing the operation request on the first locked node or second locked node.

8. The lock control method according to claim 7, wherein one or more data associated with one or more branches from the root node and the child node to be the processing target in the tree structure are included in a head of the first data in order of the one or more branches, and each data is associated with each node included in the tree structure in such a way that the each data is searched in lexicographic order in depth preferential search.

9. The lock control method according to claim 8, wherein the tree structure is a Full Blossom Tree.

10. The lock control method according to claim 7, wherein the setting includes setting, as the target node, each of a first node other than the root node, and a second node which is the child node of the first node, and wherein the lock control method further comprises:
   in a state where the first node is locked performing an additional process for second data associated with the second node proceeding in a direction from the first node to the second node, performing lock of the second node, and releasing the first node from the lock.

11. The lock control method according to claim 7, further comprising:
   use the first locked node to not perform lock of each processing target in the second processing, when performing the second processing for the first data proceeding in a direction from the child nodes to the parent node.

12. The lock control method according to claim 7, wherein the operation request is one of search of data, insertion of data, and deletion of data.

13. A non-transitory computer-readable medium storing instructions executable one or more computers, the instructions comprising:
   one or more instructions for setting, as a target node, each of one or more child nodes other than eldest child nodes among child nodes in a respective traversal path of a tree structure, wherein each layer of the tree structure is associated with deeper data in lexicographic order of the child nodes than data associated with a corresponding parent node; and
   one or more instructions configured to, in response to receiving of an operation request for first data, obtaining a first locked node by performing lock of a root node in the tree structure and repeatedly processing until a processing target is reached, the repeatedly processing comprising:
      performing a first processing that proceeds in a first direction from the first locked node to a child node of the first locked node towards the processing target;
      while the first processing is proceeding in the first direction of the respective traversal path, obtaining a determination result by performing determination of whether the child node is the processing target as the target node;

in response to the determination result indicating that the child node is the processing target as the target node, obtaining a second locked node by performing lock of the child node as the processing target and performing release the first locked node;

in response to the determination result indicating that the child node as the processing target is not the target node, do not obtain the second locked node to maintain a state that the first locked node remains locked;

while the first processing is proceeding in the first direction, determine whether a second processing should be performed proceeding in a second direction of the respective traversal path from the child node to the parent node;

in response to the determining that the second processing is not to be performed, obtain the second locked node by performing lock of the child node and performing release the first locked node;

in response to the determining that the second processing is to be performed, determine whether the processing target in the second processing is an upper node at a higher layer than the child node along the respective traversal path;

in response to the determining that the processing target in the second processing is to be proceeded to an upper node than the child node, do not obtain the second locked node and reconstitute a state of the first locked node;

in response to the determining that the processing target in the second processing is not to be proceeded to an upper node than the child node, obtain the second locked node by performing lock of the child node and performing release the first locked node; and executing the operation request on the first locked node or second locked node.

* * * * *